(12) United States Patent
Mukawa

(10) Patent No.: US 8,213,065 B2
(45) Date of Patent: Jul. 3, 2012

(54) IMAGE DISPLAY DEVICE

(75) Inventor: Hiroshi Mukawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 753 days.

(21) Appl. No.: 12/255,244

(22) Filed: Oct. 21, 2008

(65) Prior Publication Data

US 2009/0141324 A1  Jun. 4, 2009

(30) Foreign Application Priority Data

Nov. 29, 2007  (JP) .................................. 2007-309044

(51) Int. Cl.
  *G02B 5/32* (2006.01)
  *G03H 1/00* (2006.01)
(52) U.S. Cl. .............. 359/15; 359/13; 359/34; 359/569; 345/7
(58) Field of Classification Search .................. 359/566, 359/572, 573, 13, 15, 34; 385/37; 345/7
See application file for complete search history.

(56) References Cited

U.S. PATENT DOCUMENTS

| 4,711,512 A | 12/1987 | Upatnieks |
| 2006/0228073 A1 | 10/2006 | Mukawa et al. |
| 2007/0070504 A1 | 3/2007 | Akutsu et al. |
| 2007/0188837 A1 | 8/2007 | Shimizu et al. |

FOREIGN PATENT DOCUMENTS

| JP | 2007-094175 | 4/2004 |
| JP | 2007094175 | 12/2007 |
| WO | 99/52002 | 10/1999 |
| WO | 2005093493 | 6/2005 |
| WO | 2005/093493 | 10/2005 |
| WO | 2007/031991 | 3/2007 |
| WO | 2007/031991 A2 | 3/2007 |
| WO | 2007/141588 | 12/2007 |

OTHER PUBLICATIONS

Shechter, R. et al., "Planar holographic configuration for efficient imaging," Optics Communications, vol. 132, pp. 221-226, 1996.
European Search Report issued on Mar. 19, 2009, for corresponding Patent Application EP 08253847.1.
Japanese Office Action issued on Oct. 6, 2009, for corresponding Japanese Patent Application JP 2007-309044.
European Search Report issued Sep. 12, 2011, for corresponding European Appln. No. 11173481.0.
Japanese Office Action issued Mar. 6, 2012, for corresponding Japanese Appln. No. 2009-271721.

*Primary Examiner* — Audrey Y Chang
(74) *Attorney, Agent, or Firm* — K&L Gates LLP

(57) ABSTRACT

An image display device includes an image forming device, collimating optical system, and optical device, with the optical device including a light guide plate, first diffraction grating member and second diffraction grating member which are made up of a volume hologram diffraction grating, and with central light emitted from the pixel of the center of the image forming device and passed through the center of the collimating optical system being input to the light guide plate from the near side of the second diffraction grating member with a certain angle. Thus, the image display device capable of preventing occurrence of color irregularities, despite the simple configuration, can be provided.

15 Claims, 25 Drawing Sheets

TO LIGHT GUIDE PLATE

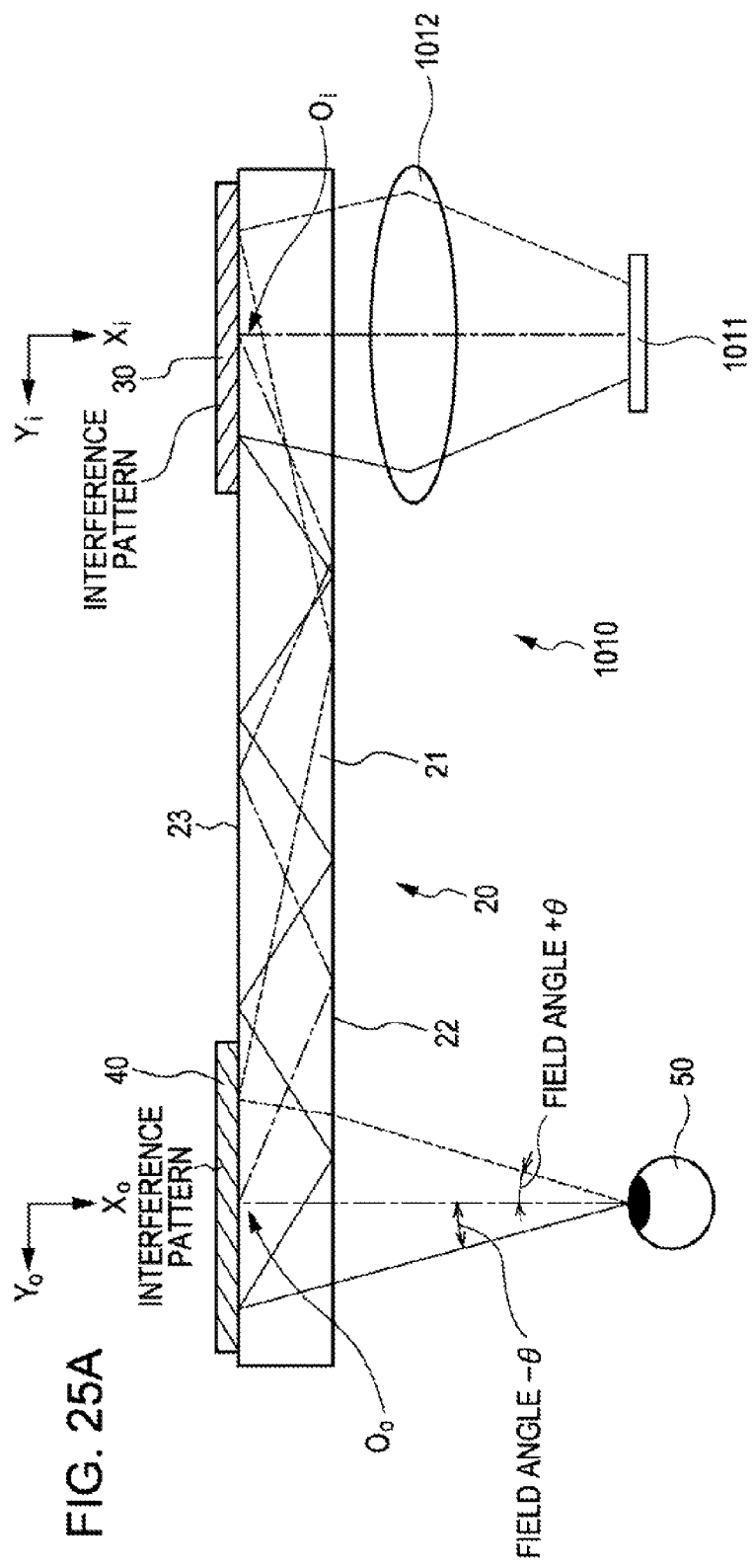
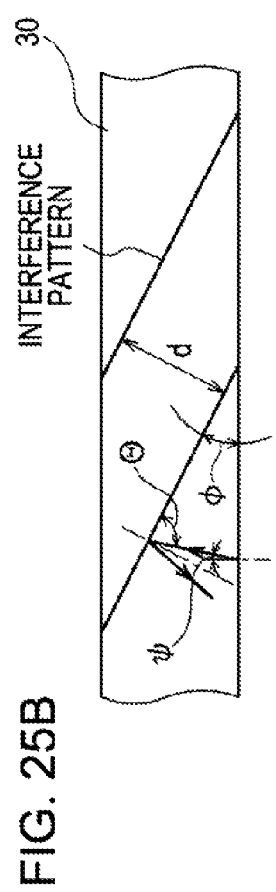

IMAGE DISPLAY DEVICE

CROSS REFERENCES TO RELATED APPLICATIONS

The present application claims priority to Japanese Patent Application JP 2007-309044 filed in the Japanese Patent Office on Nov. 29, 2007, the entire contents of which are incorporated herein by reference.

BACKGROUND

The present application relates to an image display device employed for allowing an observer to observe a two-dimensional image formed by an image forming device or the like.

A virtual image display device (image display device) employing a hologram diffraction grating for allowing an observer to observe a two-dimensional image formed by an image forming device by a virtual image optical system as an enlarged virtual image has been disclosed with Japanese Unexamined Patent Application Publication No. 2007-94175.

Such an image display device 1010 basically includes, as shown in FIG. 25A, an image forming device 1011 for displaying an image, collimating optical system 1012, and virtual image optical system (optical device 20) which light displayed on the image forming device 1011 is input to, and guided to a pupil 50 of an observer. The optical device 20 includes a light guide plate 21, and a first diffraction grating member 30 and second diffraction grating member 40, which are made up of a reflection-type volume hologram diffraction grating provided on the light guide plate 21. Light emitted from each pixel of the image forming device 1011 is input to the collimating optical system 1012, multiple parallel beams of which the angles input to the light guide plate 21 differ are generated by the collimating optical system 1012, and are input to the light guide plate 21. The parallel beams are input to one optical face (first face) 22 of the light guide plate 21, and are output therefrom. On the other hand, the first diffraction grating member 30 and second diffraction grating member 40 are attached to the other optical face (second face) 23 of the light guide plate 21 which are parallel to the first face 22 of the light guide plate 21.

Now, when assuming that the center of the first diffraction grating member 30 is the origin $O_i$, a normal of the first diffraction grating member 30 passing through the origin $O_i$ with the direction toward the collimating optical system side as the positive direction is an $X_i$ axis, and the axis line of the light guide plate with the direction toward the second diffraction grating member side as the positive direction is a $Y_i$ axis, the optical axis of the collimating optical system 1012 is identical to the $X_i$ axis, and moreover, the optical axis of the collimating optical system 1012 passes through the center of the image forming device 1011.

The multiple parallel beams of which the angles input to the light guide plate 21 from the first face 22 of the light guide plate 21 differ are input to the first diffraction grating member 30, and each of the parallel beams is diffracted and reflected as is while keeping a parallel beam state. Subsequently, the parallel beams diffracted and reflected advance while repeating total reflection between the first face 22 and second face 23 of the light guide plate 21, and input to the second diffraction grating member 40. The parallel beams input to the second diffraction grating member 40 are excluded from total reflection conditions by having been diffracted and reflected, and are emitted from the light guide plate 21, and are guided to the pupil 50 of the observer. Diffraction and reflection are performed multiple times at the second diffraction grating member 40, but the amount of light emitted from the light guide plate 21 based on each of the diffraction and reflection is reduced as the number of times of diffraction and reflection increases.

There is a symmetric relation between an interference pattern shape formed within the second diffraction grating member 40, and an interference pattern shape formed within the first diffraction grating member 30 as to a virtual plane perpendicular to the axis line of the light guide plate 21. Accordingly, the parallel beams to be diffracted and reflected at the second diffraction grating member 40 are diffracted and reflected with the same angle as the angle input to the first diffraction grating member 30, so a display image is not blurred, and is displayed at the pupil 50 with high resolution. Note that the first diffraction grating member 30 has the same specifications (e.g., thickness and maximum diffraction efficiency) as those of the second diffraction grating member 40.

SUMMARY

Incidentally, interference patterns formed within the first diffraction grating member 30 and second diffraction grating member 40 at the image display device 1010 are multiplexed, or the diffraction gratings are multi-layered. Consequently, for example, as a schematic partial cross-sectional view enlarging the first diffraction grating member 30 is shown in FIG. 25B, when assuming that the tilt angle ϕ (the angle made up of the surfaces of the first diffraction grating member 30 and second diffraction grating member 40 and an interference pattern) of an interference pattern is constant, the following problems occur.

That is to say, the angles of the multiple parallel beams to be input to the first diffraction grating member 30 differ depending on the emission position from the image forming device 1011, so diffraction wavelengths (Bragg wavelengths) satisfying Bragg conditions differ at various areas of the first diffraction grating member 30. Also, the angles to be input to the second diffraction grating member 40 differ, so diffraction wavelengths satisfying Bragg conditions differ at various areas of the second diffraction grating member 40. As a result thereof, color irregularities occur upon an image diffracted and reflected at the second diffraction grating member 40, and formed by light emitted from the light guide plate 21.

Now, the Bragg conditions means conditions satisfying the following Expression (A). In Expression (A), m denotes a positive integer, λ denotes a wavelength, d denotes a pitch on a grating face (interval in the normal direction of a virtual plane including interference patterns), and Θ denotes a supplementary angle of the angle to be input to an interference pattern. Note that the tilt angle ϕ of an interference pattern denotes an angle made up of the surface of a diffraction grating member and an interference pattern. Interference patterns are formed from the inner portion of a diffraction grating member to the surface thereof. These are true for the following. Also, a relation between the Θ, tilt angle ϕ, and incident angle ψ in a case wherein light is input to a diffraction grating member with an incident angle ψ is such as shown in Expression (B), and which is shown in FIG. 25B.

$$m \cdot \lambda = 2 \cdot d \cdot sin(\Theta) \quad (A)$$

$$\Theta = 90° - (\phi + \psi) \quad (B)$$

With the following description, let us say that the center of the second diffraction grating member 40 is a second origin $O_o$, a normal of the second diffraction grating member 40 passing through the second origin $O_o$ with the optical emission direction as the positive direction is an $X_o$ axis, and the axis line of the light guide plate 21 passed through the second origin $O_o$ orthogonal to the $X_o$ axis with the direction departed from the first diffraction grating member side as the positive direction is a $Y_o$ axis. Also, with an $X_o$-$Y_o$ plane, an angle made up of light emitted from the light guide plate 21 and the pupil 50 on the $X_o$ axis will be referred to as a field angle θ, and we will say that the value of the field angle θ of the light emitted from the light guide plate 21 on the first diffraction grating member side from the second origin $O_o$ is a positive value. Note that FIG. 25A is a schematic cross-sectional view when cutting off the light guide plate 21 at the $X_o$-$Y_o$ plane.

FIG. 21 illustrates a diffraction efficiency distribution of light with a wavelength of 480 nm through 560 nm when assuming that the field angle θ is changed from −6 degrees to +6 degrees. As apparent from FIG. 21, a diffraction spectrum is determined according to the field angle. For example, in the case of the field angle θ=+6 degrees, the center wavelength (Bragg wavelength) exists around 495 nm (see FIG. 22A), but in the case of the field angle θ=0 degree, the center wavelength (Bragg wavelength) exists around 522 nm (see FIG. 22B), and in the case of the field angle θ=−6 degrees, the center wavelength (Bragg wavelength) exists around 543 nm (see FIG. 23). That is to say, the Bragg wavelength changes by 48 nm or so. Now, simulation conditions are set wherein the refractive index of the light guide plate 21 is 1.527, the total reflected angle when light with a wavelength of 522 nm is diffracted and reflected at the center of the first diffraction grating member 30, and propagated within the light guide plate 21 is 68 degrees, the diffractive index modulation degree Δn of the diffraction grating members 30 and 40 is 0.045, and the thickness of the diffraction grating members 30 and 40 is 15 μm. Such a result is schematically illustrated in FIG. 24A with a graph drawing a relation between the diffraction efficiency due to difference of the field angle θ, and the center wavelength of a diffraction spectrum.

Also, an emission spectrum distribution in a case wherein a light source is, for example, made up of an emission diode (LED) is schematically illustrated in FIG. 24A. The emission light at each field angle is determined with the product between the emission spectrum distribution and diffraction efficiency of the light source. Accordingly, the color and brightness of the emission light at each field angle differ. Consequently, color irregularities occur within an obtained image.

With Japanese Unexamined Patent Application Publication No. 2007-94175, in order to prevent occurrence of such a phenomenon, the tilt angle of an interference pattern formed in a diffraction grating member is changed according to the position of the diffraction grating member. Such a handling method is extremely effective for prevention of occurrence of color irregularities, but with this method, the tilt angle of an interference pattern formed in a diffraction grating member is changed according to the position of the diffraction grating member, which leads to a problem wherein it is difficult to manufacture such a diffraction grating member.

Also, with this image display device 1010, the parallel beam of each field angle is diffracted and reflected multiple times at the second diffraction grating member 40. Subsequently, employing such an arrangement enables the pupil diameter in the $Y_o$ axis direction to be ensured greatly. However, with such an arrangement, there is a problem wherein the brightness of a display image is markedly changed according to the pupil position in the $Y_o$ axis direction.

There has been recognized demand to provide an image display device capable of preventing occurrence of color irregularities, and change in the brightness of a display image depending on a pupil position effectively despite the simple configuration.

According to a first mode, third mode, or fifth mode of the present application, an image display device includes: an image forming device including a plurality of pixels arrayed in a two-dimensional matrix manner; a collimating optical system for converting light emitted from the pixels of the image forming device into parallel light; and an optical device which light converted into a plurality of parallel light of which the advancing directions differ by the collimating optical system is input to, and is guided, and is emitted from; with the optical device including a light guide plate wherein input light is propagated internally by total reflection, and is emitted, a first diffraction grating member made up of a volume hologram diffraction grating for diffracting and reflecting light input to the light guide plate such that light input to the light guide plate is subjected to total reflection within the light guide plate, which is disposed on the light guide plate, and a second diffraction grating member made up of a volume hologram diffraction grating for diffracting and reflecting light propagated within the light guide plate by total reflection, and emitting the light from the light guide plate, which is disposed on the light guide plate.

According to a second mode, fourth mode, or sixth mode of the present application, an image display device includes: a light source; a scanning optical system configured to scan light emitted from the light source, and form virtual pixels arrayed in a two-dimensional matrix manner; and an optical device which parallel light from the scanning optical system is input to, and is guided, and is emitted from; with the optical device including a light guide plate wherein input light is propagated internally by total reflection, and is emitted, a first diffraction grating member made up of a volume hologram diffraction grating for diffracting and reflecting light input to the light guide plate such that light input to the light guide plate is subjected to total reflection within the light guide plate, which is disposed on the light guide plate, and a second diffraction grating member made up of a volume hologram diffraction grating for diffracting and reflecting light propagated within the light guide plate by total reflection, and emitting the light from the light guide plate, which is disposed on the light guide plate.

The volume hologram diffraction grating in the above configurations may be reflection-type volume hologram diffraction grating.

Note that light input from the scanning optical system to the optical device is parallel light as described above, which includes the following three embodiments:

(1) An embodiment wherein light emitted from a light source is converted into parallel light, and passes through the scanning optical system to input to the optical device in an unchanged state, (2) An embodiment wherein light emitted from a light source is converted into parallel light before the scanning optical system, and passes through the scanning optical system to input to the optical device in unchanged state, and (3) An embodiment wherein light emitted from a light source and passed through the scanning optical system is converted into parallel light by the collimating optical system before the optical device, and is input to the optical device.

Now, with the image display devices according to the first mode through sixth mode of the present application, we will say that the center of the first diffraction grating member is the origin, a normal of the first diffraction grating member passing through the origin with the direction toward the collimating optical system side or scanning optical system side as the positive direction is an $X_i$ axis, and the axis line of the light guide plate with the direction toward the second diffraction grating member side as the positive direction is a $Y_i$ axis. Also, we will say that the center of the second diffraction grating member is a second origin, a normal of the second diffraction grating member passing through the second origin with the optical emission direction as the positive direction is an $X_o$ axis, and the axis line of the light guide plate passed through the second origin orthogonal to the $X_o$ axis with the direction departed from the first diffraction grating member side as the positive direction is a $Y_o$ axis. Further, with an $X_o$-$Y_o$ plane, an angle made up of light emitted from the light guide plate and the pupil of an observer will be referred to as a field angle θ, and we will say that the value of the field angle θ of the light emitted from the light guide plate toward the first diffraction grating member side from the second origin $O_o$ is a positive value. Also, an angle made up of later-described central light and a normal of the light guide plate immediately before the central light is input to the light guide plate will be referred to as a central light incident angle $\theta_{i-C}$, and an angle made up of light equivalent to such central light and a normal of the light guide plate immediately after the light is emitted from the light guide plate will be referred to as a central light incident angle $\theta_{o-C}$. Further, we will say that a field angle when equivalent to such central light is emitted from the light guide plate, and input to the pupil of the observer is a field angle of 0 degree.

Subsequently, with the image display device according to the first mode of the present application, central light emitted from the pixel of the center of the image forming device, and passed through the center of the collimating optical system is optically parallel to an $X_i$-$Y_i$ plane, and is also intersected with an $X_i$-$Z_i$ plane with an acute angle. Also, with the image display device according to the second mode, central light emitted from the light source, and passed through the virtual pixel of the center of the scanning optical system is optically parallel to an $X_i$-$Y_i$ plane, and is also intersected with an $X_i$-$Z_i$ plane with an acute angle. In other words, the central light incident angle $\theta_{i-C}$ has a positive value of less than 90 degrees in the $X_iY_iZ_i$ coordinates system. That is to say, the central light is input to the light guide plate from a side near the second diffraction grating member with an angle.

With the image display device according to the first mode or second mode of the present application, it is desirable to employ an arrangement wherein the $Y_i$ axis is optically orthogonal to an interference pattern formed in the first diffraction grating member. Note that it is also desirable for the image display devices according to the third mode through sixth mode of the present application to employ the same arrangement.

With the image display device according the first mode or second mode of the present application including the above-mentioned desired arrangement, it is desirable to employ an arrangement wherein the optical axis of the collimating optical system or the center axis of the scanning optical system is parallel to the $X_i$-$Y_i$ plane, and is also intersected with the $X_i$-$Z_i$ plane with an acute angle. Note that the image display device having such an arrangement will be referred to as an image display device having a first/second-A arrangement for convenience sake. Subsequently, with the image display device having a first/second-A arrangement, it is desirable to employ an embodiment wherein the optical axis of the collimating optical system or the center axis of the scanning optical system passes through the center of the image forming device or light source. With the image display device having a first/second-A arrangement, more specifically, an angle made up of such central light and the $Y_i$ axis immediately before central light is input to the light guide plate has a positive value (90°−$\theta_{i-C}$). Note that there are a case wherein the center of the image forming device or light source is positioned on an extended line of the optical axis of the collimating optical system or the center axis of the scanning optical system, and a case wherein the center of the image forming device or light source is not positioned on an extended line of the optical axis of the collimating optical system or the center axis of the scanning optical system, but even in the latter case, an embodiment may be employed wherein the optical axis of the collimating optical system or the center axis of the scanning optical system passes through the center of the image forming device or light source via various types of optical system. Accordingly, expression has been made wherein the optical axis of the collimating optical system or the center axis of the scanning optical system passes through the center of the image forming device or light source "optically". This holds true for the following description as well.

The image display device according to the second mode of the present application further includes a collimating optical system for converting light emitted from the scanning optical system into parallel light, and with the image display device according to the second mode, or the image display device according to the first mode of the present application including the desired arrangement, it is desirable to employ an arrangement wherein the optical axis of the collimating optical system or the center axis of the scanning optical system is parallel to the $X_i$ axis, and the optical axis of the collimating optical system passes through a position deviant from the center of the image forming device, and also the center axis of the scanning optical system is not identical to the $X_i$ axis. Note that the image display device having such an arrangement will be referred to as an image display device having a first/second-B arrangement for convenience sake. With the image display device having a first/second-B arrangement as well, more specifically, an angle made up of such central light and the $Y_i$ axis immediately before central light is input to the light guide plate has a positive value (90°−$\theta_{i-C}$).

With the image display device according to the first mode or second mode of the present application including the above-mentioned various desirable arrangements and embodiments, it is desirable to employ an arrangement wherein light emitted from the light guide plate equivalent to central light is optically parallel to the $X_o$-$Y_o$ plane, and is also intersected the $X_o$-$Z_o$ plane with an obtuse angle. That is to say, it is desirable that the value of the central light emission angle $\theta_{o-C}$ is equal to a value exceeding 90 degrees with the $X_oY_oZ_o$ coordinates system. Note that it is further desirable that the absolute value of the central light incident angle $\theta_{i-C}$ is equal to the absolute value of the central emission angle $\theta_{o-C}$.

Further, with the image display device according to the first mode or second mode of the present application including the above-mentioned various types of desirable arrangements and embodiments, it is desirable to employ an arrangement wherein light emitted from the light guide plate equivalent to central light is orthogonal to a straight line connecting the two pupil centers of the observer.

Let us say that an angle (an angle making up a normal of the light guide plate, and is referred to as a central light total reflected angle) when light diffracted and reflected at an interference pattern of the first diffraction grating member included in an image display device according to the related art with the central light incident angle $\theta_{i-C}$ as 0 degree, and propagated within the light guide plate collides with the inner face of the light guide plate is $\theta_{Ref}$. With the image display device according to the first mode or second mode of the present application including the above-mentioned various types of desirable arrangements and embodiments, an interference pattern is formed on the first diffraction grating member, and light input to the first diffraction grating member is diffracted and reflected by such an interference pattern. Though not restricted here, it is desirable to design an interference pattern of the first diffraction grating member such that an angle when the central light propagated within the light guide plate collides with the inner face of the light guide plate is $\theta_{Ref}$, and with the second diffraction grating member as well, it is desirable to provide the same type of interference pattern.

With the image display device according to the third mode or fourth mode of the present application, the thickness of the second diffraction grating member is thinner than the thickness of the first diffraction grating member.

Subsequently, with the image display device according to the third mode or fourth mode of the present application, it is desirable to employ an arrangement wherein the thickness of the second diffraction grating member is less than 5 μm, and the thickness of the first diffraction grating member is equal to or greater than 5 μm.

Note that the image display device according to the third mode or fourth mode of the present application including the above-mentioned desirable arrangement may be applied to the image display device according to the first mode or second mode of the present application including the above-mentioned various types of desirable arrangements and embodiments.

With the image display device according to the fifth mode or sixth mode of the present application, the value of the maximum diffraction efficiency of the second diffraction grating member is smaller than the value of the maximum diffraction efficiency of the first diffraction grating member.

Subsequently, with the image display device according to the fifth mode or sixth mode of the present application, it is desirable to employ an arrangement wherein the maximum diffraction efficiency of the second diffraction grating member is less than 50%, more preferably, 25%±10%, and the maximum diffraction efficiency of the first diffraction grating member is equal to or greater than 50%, more preferably, 90%±10%. Note that, for example, a diffraction grating member having the value of the different maximum diffraction efficiency can be obtained by changing the refractive index modulation degree Δn at the time of forming an interference pattern of the first diffraction grating member or second diffraction grating member, and a diffraction grating member having the value of the different maximum diffraction efficiency can be obtained by changing the thickness of the first diffraction grating member or second diffraction grating member.

Note that the image display device according to the fifth mode or sixth mode of the present application including the above-mentioned desirable arrangement may be applied to the image display device according to the first mode or second mode of the present application including the above-mentioned various types of desirable arrangements and embodiments.

Alternatively, with the image display device according to the third mode, fourth mode, fifth mode, or sixth mode of the present application, an arrangement and configuration may be made wherein the optical axis of the collimating optical system or the center axis of the scanning optical system are optically identical to the $X_i$ axis, and moreover, the optical axis of the collimating optical system or the center axis of the scanning optical system passes through the center of the image forming device or the center of the light source. That is to say, an arrangement may be made wherein the central light incident angle $\theta_{i-C}$ is set to 0 degree. Note that there is a case wherein the $X_i$ axis exists or the center of the image forming device or light source is positioned on an extended line of the optical axis of the collimating optical system or the center axis of the scanning optical system, and a case wherein no $X_i$ axis exists, and the center of the image forming device or light source is not positioned on an extended line of the optical axis of the collimating optical system or the center axis of the scanning optical system, but even in the latter case, an embodiment may be employed wherein the optical axis of the collimating optical system or the center axis of the scanning optical system is optically identical to the $X_i$ axis, or/and passes through the center of the image forming device or light source, via various types of optical systems.

With the image display device according to the second mode, fourth mode, or sixth mode of the present application, a collimating optical system (referred to as a light source collimating optical system) for converting light emitted from the light source into parallel light may be provided. Also, an embodiment may be employed wherein the light source is operated based on the field sequential method.

With the image display devices according to the first mode through sixth mode of the present application (hereafter, there will also be referred to as image display devices according to the present application correctively), in order to be compatible with the diffraction and reflection of P types of light having different P types (e.g., P=3, three types of red, green, and blue) of wavelength band (or wavelength), the first diffraction grating member or second diffraction grating member may be configured by P diffraction grating layers made up of a reflection-type volume hologram diffraction grating being layered. Note that the interference pattern corresponding to one type of wavelength band (or wavelength) is formed on each diffraction grating layer. Alternatively, in order to be compatible with the diffraction and reflection of P types of light having different P types of wavelength band (or wavelength), an arrangement may be made wherein P types of interference patterns are formed on the first diffraction grating member or second diffraction grating member made up of one diffraction grating layer. Alternatively, an arrangement may be made wherein a field angle is, for example, divided into three, and the first diffraction grating member or second diffraction grating member is configured by the diffraction grating layer corresponding to each field angle being layered. Subsequently, these arrangements are employed, thereby realizing increase in diffraction efficiency, increase in a diffraction acceptance angle, and optimization of a diffraction angle when light including each wavelength band (or wavelength) is diffracted and reflected at the first diffraction grating member or second diffraction grating member.

Note that the term "field angle θ" in the following description is strictly defined as a visual angle when viewing the object range of the optical system from the image space of the optical system. Also, the term "total reflection" means internal total reflection, or total reflection within the light guide plate. Further, the term "the tilt angle of an interference pattern" means an angle made up of the surface of a diffraction grating member (or diffraction grating layer) and an interference pattern.

With the image display devices according to the present application, light converted into the multiple parallel beams of which the advancing directions differ by the collimating optical system is input to the light guide plate, but a request for such parallel beams is based on that light wave surface information when these beams are input to the light guide plate has to be saved even after the beams are emitted from the light guide plate through the first diffraction grating member and second diffraction grating member. Note that, specifically, in order to generate multiple parallel beams of which the advancing directions differ, the image forming device has to be disposed at a place (position) of the focal length of the collimating optical system. Now, the collimating optical system has a function for converting the position information of the pixel in the image forming device of the parallel beams emitted from the image forming device into angle information with the optical system of the optical device. Also, multiple parallel beams of which the advancing directions differ are generated at the collimating optical system, so with the light guide plate, the multiple parallel beams of which the advancing directions differ are input, internally propagated by total reflection, and then emitted. With the first diffraction grating member, the parallel beams input to the light guide plate are diffracted and reflected such that the parallel beams input to the light guide plate are subjected to total reflection within the light guide plate. Further, with the second diffraction grating member, the parallel beams propagated within the light guide plate by total reflection are diffracted and reflected, and are emitted from the light guide plate in a parallel light state.

With the image display devices according to the present application, the light guide plate has two parallel faces (first face and second face) extending in parallel with the axis line ($Y_i$ axis, $Y_o$ axis direction) of the light guide plate. Here, when taking the face of the light guide plate to which light is input as a light guide plate incident face, and taking the face of the light guide plate from which light is emitted as a light guide plate emission face, the light guide plate incident face and light guide plate emission face may be configured of the first face, or an arrangement may be made wherein the light guide plate incident face is configured of the first face, and the light guide plate emission face is configured of the second face. In the former case, the first diffraction grating member and second diffraction grating member are disposed on the second face. On the other hand, in the latter case, the first diffraction grating member is disposed on the second face, and the second diffraction grating member is disposed on the first face.

A photopolymer material may be employed as a material making up the first diffraction grating member and second diffraction grating member. The constituent material and basic configuration of the first diffraction grating member and second diffraction grating member made up of a reflection-type volume hologram diffraction grating have to be the same as the constituent material and configuration of a reflection-type volume hologram diffraction grating according to the related art. Here, the term "reflection-type volume hologram diffraction grating" means a hologram diffraction grating for diffracting and reflecting only diffraction light of +1 order.

An interference pattern is formed on the diffraction grating members from the inside to the surface thereof, but a method for forming such an interference pattern itself has to be the same as a forming method according to the related art. Specifically, for example, an arrangement may be made wherein object light is irradiated on a member (e.g., photopolymer material) making up a diffraction grating member from a first predetermined direction on one side, and simultaneously, reference light is irradiated on the member making up the diffraction grating member from a second predetermined direction on the other side, and an interference pattern formed by the object light and reference light is recorded in the inside of the member making up the diffraction grating member. The first predetermined direction, second predetermined direction, the wavelengths of objective light and reference light are appropriately selected, whereby a desired interference pattern pitch, and a desired tilt angle of an interference pattern on the surface of the diffraction grating member can be obtained.

In a case wherein the first diffraction grating member and second diffraction grating member are configured of the layered configuration of P diffraction grating layers made up of a reflection-type volume hologram diffraction grating, with regard to layering of such a diffraction grating layer, after the P diffraction grating layers are fabricated separately, the P diffraction grating layers has to be layered (bonded) employing, for example, UV cure adhesive. Alternatively, an arrangement may be made wherein after one diffraction grating layer is fabricated employing a photopolymer material having adhesiveness, a photopolymer material having adhesiveness is adhered thereupon to fabricate a diffraction grating layer, thereby fabricating P diffraction grating layers.

Examples of a material making up the light guide plate include glass including optical glass such as quartz glass, BK7, or the like, and a plastic material (e.g., PMMA, polycarbonate resin, acrylic resin, amorphia polypropylene resin, styrene resin including AS resin). The shape of the light guide plate is not restricted to a flat plate, and accordingly may have a curved shape. In the case of the former, the $Y_i$ axis is identical or parallel to the $Y_o$ axis, but in the case of the latter, the $Y_i$ axis is neither identical nor parallel to the $Y_o$ axis.

Examples of the image forming device making up the image display device according to the first mode, third mode, or fifth mode of the present application include an image forming device configured of an emission device such as organic EL (Electro Luminescence), inorganic EL, emission diode (LED), or the like, and an image forming device made up of a combination between an emission device and light valve (e.g., transmission-type or reflection-type liquid crystal display device such as LCOS (Liquid Crystal On Silicon) or the like, digital micro mirror device (DMD)). An example of the scanning optical system of the image display device according to the second mode, fourth mode, or sixth mode is a scanning optical system (e.g., MEMS (Micro Electro Mechanical Systems), galvanomirror) for subjecting light emitted from the light source to horizontal scanning and vertical scanning, and examples of the emission device making up the light source include a red emission device, green emission device, and blue emission device. Here, for example, a semiconductor laser device and LED can be exemplified as the emission device. The number of pixels (virtual pixels) has to be determined based on the specification requested to the image display device, and 320×240, 432×240, 640×480, 1024×768, 1920×1080 can be exemplified as specific values of the number of pixels (virtual pixels).

For example, the following arrangements can be exemplified as the image forming device or light source made up of an emission device and light valve as well as a combination of a backlight for emitting white light as a whole, and a liquid crystal display device having a red emission device, green emission device, and blue emission device.

Image Forming Device A

An image forming device A includes (α) A first image forming device made up of a first emission panel where first emission devices for emitting a blue color are arrayed in a two-dimensional matrix manner, (β) A second image forming device made up of a second emission panel where second emission devices for emitting a green color are arrayed in a two-dimensional matrix manner, (γ) A third image forming device made up of a third emission panel where third emission devices for emitting a red color are arrayed in a two-dimensional matrix manner, and (δ) A unit for assembling light emitted from the first image forming device, second image forming device, and third image forming device into one optical path (e.g., dichroic prism, this is true for the following description), and controls the emission/non-emission state of each of the first emission device, second emission device, and third emission device.

Image Forming Device B

An image forming device B includes (α) A first image forming device made up of a first emission device for emitting a blue color, and a first light passage control device (a type of light valve made up of, e.g., a liquid crystal display device, digital micro mirror device (DMD), or LCOS, which is true for the following description) for controlling passage/non-passage of emission light emitted from the first emission device for emitting a blue color, (β) A second image forming device made up of a second emission device for emitting a green color, and a second light passage control device (light valve) for controlling passage/non-passage of emission light emitted from the second emission device for emitting a green color, (γ) A third image forming device made up of a third emission device for emitting a red color, and a third light passage control device (light valve) for controlling passage/non-passage of emission light emitted from the third emission device for emitting a red color, and (δ) A unit for assembling light passed through the first light passage control device, second light passage control device, and third light passage control device into one optical path, and displays an image by the light passage control devices controlling passage/non-passage of emission light emitted from these emission devices. A light guide member, micro lens array, mirror, reflection plate, and condenser lens can be exemplified as a unit (light guide member) for guiding emission light emitted from the first emission device, second emission device, and third emission device to the corresponding light passage control device.

Image Forming Device C

An image forming device C includes (α) A first image forming device made up of a first emission panel where first emission devices for emitting a blue color are arrayed in a two-dimensional matrix manner, and a blue light passage control device (light valve) for controlling passage/non-passage of emission light emitted from the first emission panel, (β) A second image forming device made up of a second emission panel where second emission devices for emitting a green color are arrayed in a two-dimensional matrix manner, and a green light passage control device (light valve) for controlling passage/non-passage of emission light emitted from the second emission panel, (γ) A third image forming device made up of a third emission panel where third emission devices for emitting a red color are arrayed in a two-dimensional matrix manner, and a red light passage control device (light valve) for controlling passage/non-passage of emission light emitted from the third emission panel, and (δ) A unit for assembling light emitted from the blue light passage control device, green light passage control device, and red light passage control device into one optical path, and displays an image by the light passage control devices (light valves) controlling passage/non-passage of emission light emitted from these first emission panel, second emission panel, and third emission panel.

Image Forming Device D

An image forming device D is an image forming device for color display employing the field sequential method, and includes (α) A first image forming device including a first emission device for emitting a blue color, (β) A second image forming device including a second emission device for emitting a green color, (γ) A third image forming device including a third emission device for emitting a red color, (δ) A unit for assembling light emitted from the first image forming device, second image forming device, and third image forming device into one optical path, and (ε) A light passage control device (light valve) for controlling passage/non-passage of light emitted from the unit for assembling the light into one optical path, and displays an image by the light passage control device controlling passage/non-passage of emission light emitted from these emission devices.

Image Forming Device E

An image forming device E is also an image forming device for color display employing the field sequential method, and includes (α) A first image forming device made up of a first emission panel where first emission devices for emitting a blue color are arrayed in a two-dimensional matrix manner, (β) A second image forming device made up of a second emission panel where second emission devices for emitting a green color are arrayed in a two-dimensional matrix manner, (γ) A third image forming device made up of a third emission panel where third emission devices for emitting a red color are arrayed in a two-dimensional matrix manner, (δ) A unit for assembling light emitted from the first image forming device, second image forming device, and third image forming device into one optical path, and (ε) A light passage control device (light valve) for controlling passage/non-passage of light emitted from the unit for assembling the light into one optical path, and displays an image by the light passage control device controlling passage/non-passage of emission light emitted from these emission panels.

Image Forming Device F

An image forming device F is an image forming device for color display of a passive matrix type or active matrix type for displaying an image by controlling the emission/non-emission state of each of a first emission device, second emission device, and third emission device.

Image Forming Device G

An image forming device G is an image forming device for color display employing the field sequential method, includes a light passage control device (light valve) for controlling passage/non-passage of emission light from emission device units arrayed in a two-dimensional matrix manner, and displays an image by controlling the emission/non-emission sate of each of a first emission device, second emission device, and third emission device of the mission device unit in a time-sharing manner, and further the light passage control device controlling passage/non-passage of emission light emitted from the first emission device, second emission device, and third emission device.

An optical system wherein a convex lens, concave lens, free sculptured surface prism, and hologram lens are employed individually or in a combined manner, having positive optical power as a whole can be exemplified as the collimating optical system making up the image display devices according to the present application.

According to the image display devices according to the present application, for example, an HMD (Head Mounted Display) can be configured, reduction in weight and reduction in size of the device can be realized, uncomfortable feeling at the time of mounting the device can be reduced extremely, and further, reduction in manufacturing cost can be realized.

With the image display device according to the first mode or second mode of the present application, the central light is optically parallel to the $X_i$-$Y_i$ plane, and is also intersected with the $X_i$-$Z_i$ plane with an acute angle. Therefore, with light input to the light guide plate and colliding with an interference pattern formed within the first diffraction grating member, the change amount of the Bragg wavelength per unit incident angle as to an interference pattern can be reduced, and consequently, occurrence of color irregularities can be prevented effectively, and accordingly, the image display device having high display quality can be provided.

With the image display device according to the third mode or fourth mode of the present application, the thickness of the second diffraction grating member is thinner than the thickness of the first diffraction grating member. Also, with the image display device according to the fifth mode or sixth mode of the present application, the value of the maximum diffraction efficiency of the second diffraction grating member is smaller than the maximum diffraction efficiency of the first diffraction grating member. Therefore, the pupil diameter in the axis line direction of the light guide plate can be increased, and moreover, a problem can be solved wherein the brightness of a display image is markedly changed depending on the pupil position in the axis line direction of the light guide plate, and accordingly, the image display device with high-uniformity of brightness can be provided without reducing light use efficiency markedly.

Additional features and advantages are described herein, and will be apparent from the following Detailed Description and the figures.

BRIEF DESCRIPTION OF THE FIGURES

FIG. 25A is a conceptual diagram of the image forming device according to the related art, and FIG. 25B is a schematically partial cross-sectional view enlarging a first diffraction grating member.

DETAILED DESCRIPTION

The present application will be described below based on embodiments with reference to the drawings.

First Embodiment

Figure 1:
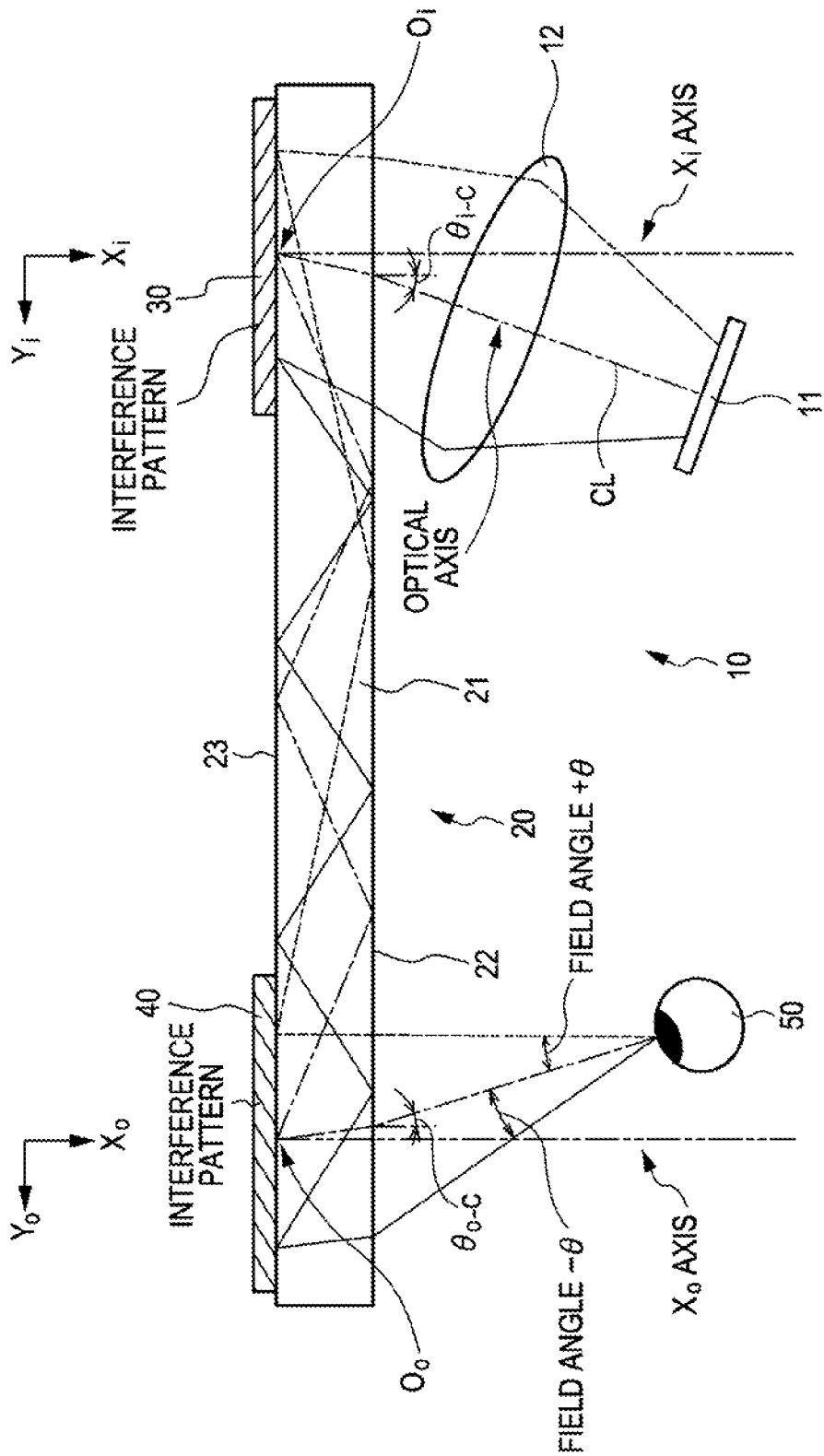
FIG. 1 is a conceptual diagram of an image display device according to a first embodiment.

A first embodiment relates to an image display device according to the first mode of the present application, more specifically, relates to an image display device having a first-A arrangement. As a conceptual diagram is shown in FIG. 1, the image display device according to the first embodiment includes (A) An image forming device 11 including multiple pixels arrayed in a two-dimensional matrix manner, (B) A collimating optical system 12 for converting light emitted from the image forming device 11 into parallel light, and (C) An optical device 20 which light converted into multiple parallel beams of which the advancing directions differ by the collimating optical system 12 is input to, guided through, and emitted from.

The optical device 20 includes (a) A light guide plate 21 wherein input light (more specifically, a parallel light flux group made up of multiple parallel light fluxes of which the advancing directions differ) is propagated internally by total reflection, and is then emitted, (b) A first diffraction grating member 30 made up of a reflection-type volume hologram diffraction grating for diffracting and reflecting the light (parallel light flux group) input to the light guide plate 21 such that the light (parallel light flux group) input to the light guide plate 21 is internally subjected to total reflection, which is disposed in the light guide plate 21, and (c) A second diffraction grating member 40 made up of a reflection-type volume hologram diffraction grating for diffracting and reflecting the light (parallel light flux group) propagated within the light guide plate 21 by total reflection, and emitting (more specifically, emitting without changing the parallel light flux group) the light from the light guide plate 21, which is disposed in the light guide plate 21. Note that the light emitted from the light guide plate 21 is input to the position of the pupil 50 of the observer (image observer).

Now, with the first embodiment or a later-described second embodiment through sixth embodiment, in order to be compatible with the diffraction and reflection of P types of light having different P types (e.g., P=3, three types of red, green, and blue) of wavelength band (or wavelength), the first diffraction grating member 30 and second diffraction grating member 40 are configured by P diffraction grating layers made up of a reflection-type volume hologram diffraction grating being layered. Note that the interference pattern corresponding to one type of wavelength band (or wavelength) is formed on each diffraction grating layer made up of a photopolymer material, which has been fabricated with the related art. More specifically, the first diffraction grating member 30 and second diffraction grating member 40 have a configuration wherein a diffraction grating layer for diffracting and reflecting red light, a diffraction grating layer for diffracting and reflecting green light, and a diffraction grating layer for diffracting and reflecting blue light are layered. The pitch of the interference patterns formed on the diffraction grating layers (diffraction optical devices) is constant, and the interference patterns are in a linear shape, and are parallel to the Z axis direction. Note that in FIG. 1, the first diffraction grating member 30 and second diffraction grating member 40 are shown with one layer. Such an arrangement is employed, thereby realizing increase in diffraction efficiency, increase in a diffraction acceptance angle, and optimization of a diffraction angle when light having each wavelength band (or wavelength) is diffracted and reflected at the first diffraction grating member 30 and second diffraction grating member 40.

With the first embodiment, the image forming device 11 is configured of, for example, a liquid crystal display device (LCD) including multiple (e.g., J in the $Y_i$ axis direction, and K in the $Z_i$ axis direction, i.e., J×K=320×240) pixels (liquid crystal cells) arrayed in a two-dimensional matrix manner, and the collimating optical system 12 is configured of, for example, a convex lens, and multiple parallel beams of which the advancing directions differ are generated, so the image forming device 11 is disposed in the location (position) of the focal length of the collimating optical system 12. Also, one pixel is configured of a red emission sub pixel for emitting a red color, a green emission sub pixel for emitting a green color, and a blue emission sub pixel for emitting a blue color. This is true for later-described second and fifth embodiments.

Now, the light guide plate 21 has two parallel faces (first face 22 and second face 23) extending in parallel to the axis line of the light guide plate 21. Note that the $Y_i$ axis is identical to the $Y_o$ axis, the $X_i$ axis is parallel to the $X_o$ axis (these are shown with a two-dot chain line), and the $Z_i$ axis is parallel to the $Z_o$ axis. Note that with the center of the first diffraction grating member 30 as the origin $O_i$, the $X_i$ axis is a normal of the first diffraction grating member 30 passed through the origin $O_i$, and is a normal with a direction toward the collimating optical system side as a positive direction. With the center of the second diffraction grating member 40 as the origin $O_o$, the $X_o$ axis is a normal of the second diffraction grating member 40 passed through the origin $O_o$, and is a normal with the emission direction of light as a positive direction. Here, the first face 22 faces the second face 23. The parallel light is input from the first face 22, propagated internally by total reflection, and emitted from the first face 22. The first diffraction grating member 30 is disposed on the second face 23 of the light guide plate 21, and diffracts and reflects the parallel light input to the light guide plate 21 such that the parallel light input from the first face 22 to the light guide plate 21 is subjected to total reflection within the light guile plate 21. Further, the second diffraction grating member 40 is disposed on the second face 23 of the light guide plate 21, diffracts and reflects the parallel light propagated within the light guide plate 21 by total reflection multiple times, and emits this from the first face 22 of the light guide plate 21 without changing the parallel light. However, the present application is not restricted to this, and accordingly, an arrangement may be made wherein the light guide plate incident face is configured of the second face 23, and the light guide plate emission face is configured of the first face 22.

Subsequently, with the first embodiment, the parallel light of three colors of red, green, and blue is propagated within the light guide plate 21 by total reflection, and is emitted. At this time, the light guide plate 21 is thin, and the optical path advancing within the light guide plate 21 is long, so the number of times of total reflection until the parallel light reaches the second diffraction grating member 40 differs depending on each field angle. More specifically, of the parallel light input to the light guide plate 21, the number of times of reflection of the parallel light input with an angle in a direction approaching the second diffraction grating member 40 is smaller than the number of times of reflection of the parallel light input to the light guide plate 21 with an angle in a direction departing from the second diffraction grating member 40. This is because with the parallel light to be diffracted and reflected at the first diffraction grating member 30, the parallel light input to the light guide plate 21 with an angle in a direction approaching the second diffraction grating member 40 has a smaller angle made up of the light propagated within the light guide plate 21, and a normal of the light guide plate 21 when colliding with the inner face of the light guide plate 21, as compared to the parallel light input to the light guide plate 21 with an angle in the opposite direction thereof. Also, the shape of an interference pattern formed within the second diffraction grating member 40, and the shape of an interference pattern formed within the first diffraction grating member 30 have a symmetric relation as to a virtual face perpendicular to the axis line of the light guide plate 21.

Later-described light guide plates 21 according to the second embodiment through sixth embodiment also have basically the same arrangement and configuration as those of the above-mentioned light guide plate 21.

With the image display device according to the first embodiment, central light CL emitted from the pixel of the center of the image forming device 11, passed through the center of the collimating optical system 12 is optically parallel to the $X_i$-$Y_i$ plane, and is also intersected with the $X_i$-$Z_i$ plane with an acute angle. That is to say, with the first embodiment, the central light incident angle $\theta_{i\text{-}C}$ has a positive value less than 90 degrees (more specifically, 90 degrees−70 degrees=20 degrees) in the $X_i Y_i Z_i$ coordinates system. Also, the central light CL is subjected to total reflection within the light guide plate 21 (central light total reflected angle is $\theta_{Ref}$), diffracted and reflected at the second diffraction grating member 40, and emitted from the light guide plate 21 with the central light emission angle $\theta_{o\text{-}C}$.

Thus, with the first embodiment, the optical axis of the collimating optical system 12 is parallel to the $X_i$-$Y_i$ plane (more specifically, positioned within the $X_i$-$Y_i$ plane), and is also intersected with the $X_i$-$Z_i$ plane with an acute angle (specifically, 90 degrees−$\theta_{i\text{-}C}$=70 degrees). Subsequently, the optical axis of the collimating optical system 12 optically passes through the center of the image forming device 11. Note that, with the first embodiment, the center of the image forming device 11 is positioned on an extending line of the optical axis of the collimating optical system 12, but the present application is not restricted to this, and an embodiment may be employed wherein the optical axis of the collimating optical system 12 optically passes through the center of the image forming device 11 via various types of optical system. Also, the light propagated on the optical axis of the collimating optical system 12 is input to the origin $O_i$ which is the center of the first diffraction grating member 30, but such light may be directly input to the light guide plate 21 from the collimating optical system 12, or may be input to the light guide plate 21 from the collimating optical system 12 via various types of optical system.

Further, the light emitted from the light guide plate 21 which is equivalent to the central light CL is optically parallel to the $X_o$-$Y_o$ plane, and is also intersected with the $X_o$-$Z_o$ plane with an obtuse angle. Subsequently, as described above, the shape of an interference pattern formed within the second diffraction grating member 40, and the shape of an interference pattern formed within the first diffraction grating member 30 have a symmetric relation as to a virtual face perpendicular to the axis line of the light guide plate 21, the value of the central light emission angle $\theta_{o\text{-}C}$ is a value exceeding 90 degrees (specifically, −20 degrees) with the $X_o Y_o Z_o$ coordinates system, and the absolute value of the central light incident angle $\theta_{i\text{-}C}$ is equal to the absolute value of the central light emission angle $\theta_{o\text{-}C}$. This is true for later-described second embodiment through sixth embodiment.

The $Y_i$ axis is optically orthogonal to an interference pattern formed in the first diffraction grating member 30. Further, the $Y_o$ axis is optically orthogonal to an interference pattern formed in the second diffraction grating member 40. This is true for later-described second embodiment through sixth embodiment.

Figure 2:
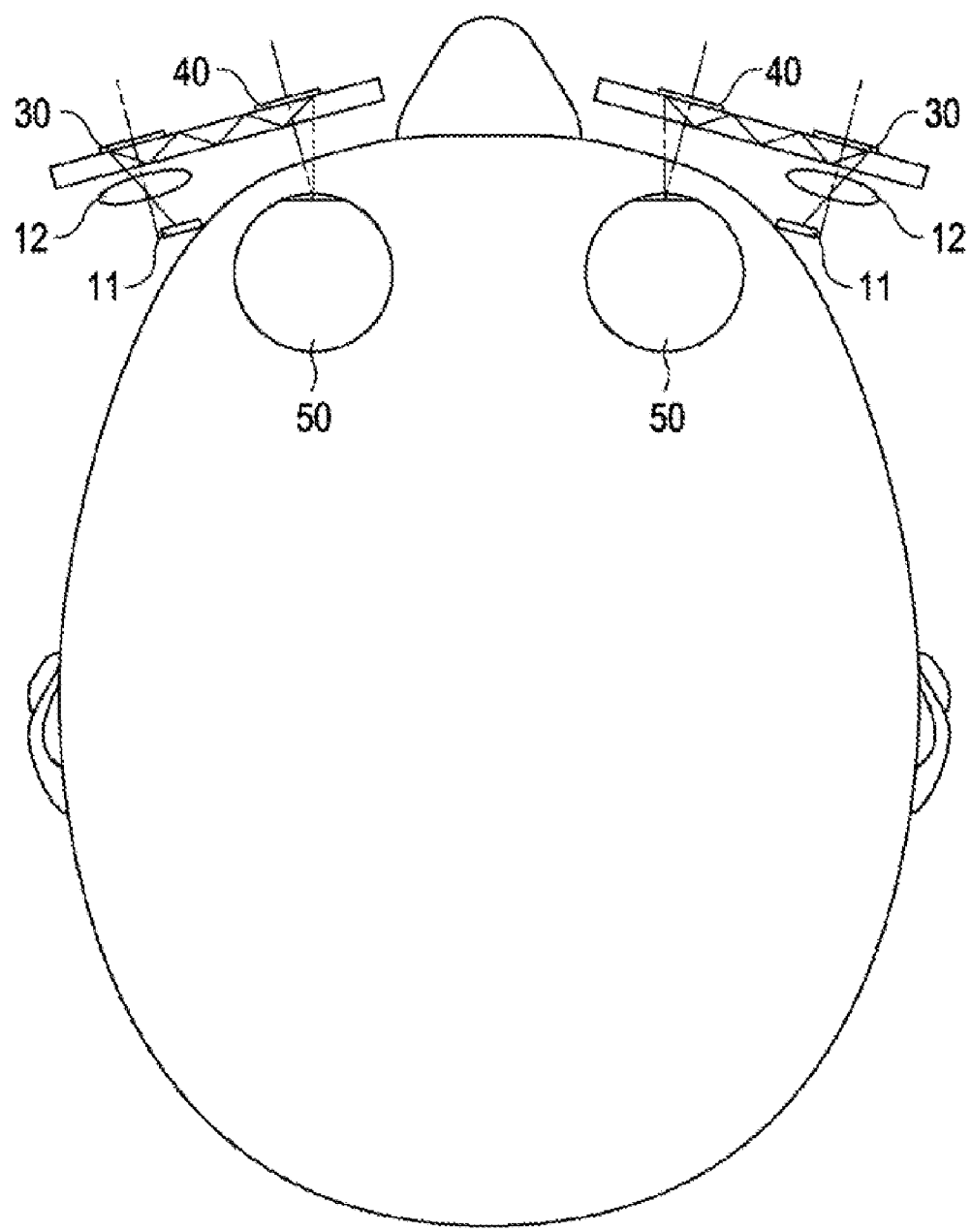
FIG. 2 is a conceptual diagram illustrating a state in which an observer puts on two sets of the image display devices according to the first embodiment.

Subsequently, as a conceptual diagram is shown in FIG. 2, the light emitted from the light guide plate 21 which is equivalent to the central light CL is orthogonal to a straight line connecting the two pupils 50 of the observer. Note that there is, for example, a case wherein the angle is set to 90 degrees±2 degrees for the sake of fine adjustment, so the concept of "orthogonal to" includes a range of "90 degrees±2 degrees". This is true for later-described second embodiment through fourth embodiment. Note that in FIG. 2, two sets of image display devices are displayed, one of the image display devices is for right eyes, and the other image display device is for left eyes. The image display device for right eyes and image display device for left eyes may display the same image, or may display a different image (e.g., image capable of displaying a stereogram). However, it goes without saying that such an image display device may be mounted on the eye on one side. Here, the image display devices serve as an HMD (Head Mounted Display).

Note that, with the first embodiment, an interference pattern in the first diffraction grating member 30 is designed such that the angle when the central light CL propagated within the light guide plate 21 collides the inner face of the light guide plate 21 becomes the same angle as the angel $\theta_{Ref}$ when light diffracted and reflected at an interference pattern in the first diffraction grating member provided in an image display device according to the related art with the central light incident angle $\theta_{i\text{-}C}$ as 0 degree, and propagated within the light guide plate collides the inner face of the light guide plate. The same interference pattern is also provided in the second diffraction grating member 40. This is true for later-described second embodiment through sixth embodiment, unless otherwise noted.

Figure 3:
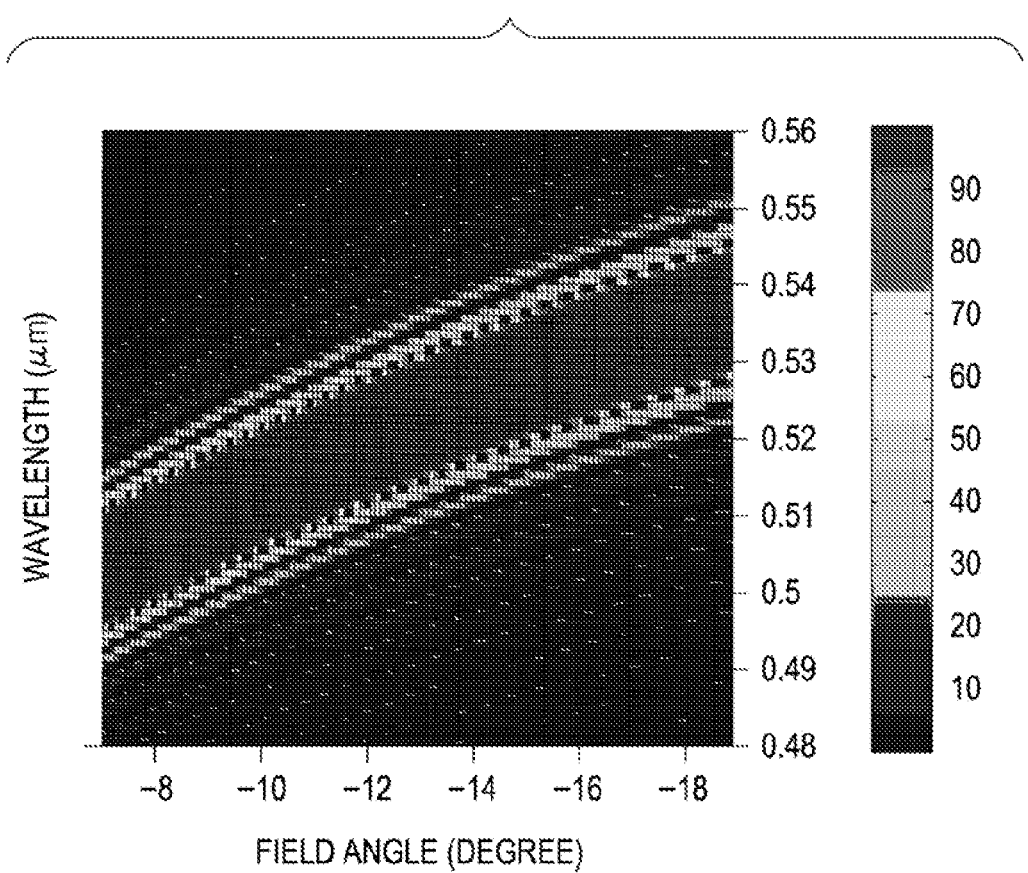
FIG. 3 is a graph illustrating a diffraction efficiency distribution of light with a wavelength of 480 nm through 560 nm when changing a field angle θ from −6 degrees to +6 degrees with the image display device according to the first embodiment.
Figure 4A:
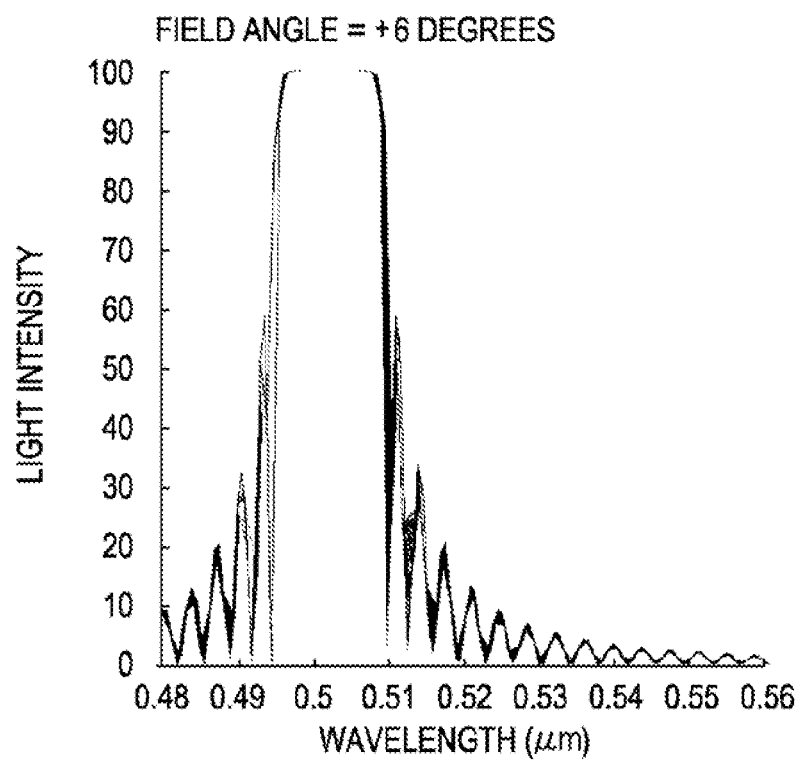
FIGS. 4A and 4B are graphs illustrating a diffraction spectrum in the case of the field angle θ=+6 degrees and in the case of the filed angle θ=0 degree with the image display device according to the first embodiment, respectively.
Figure 4B:
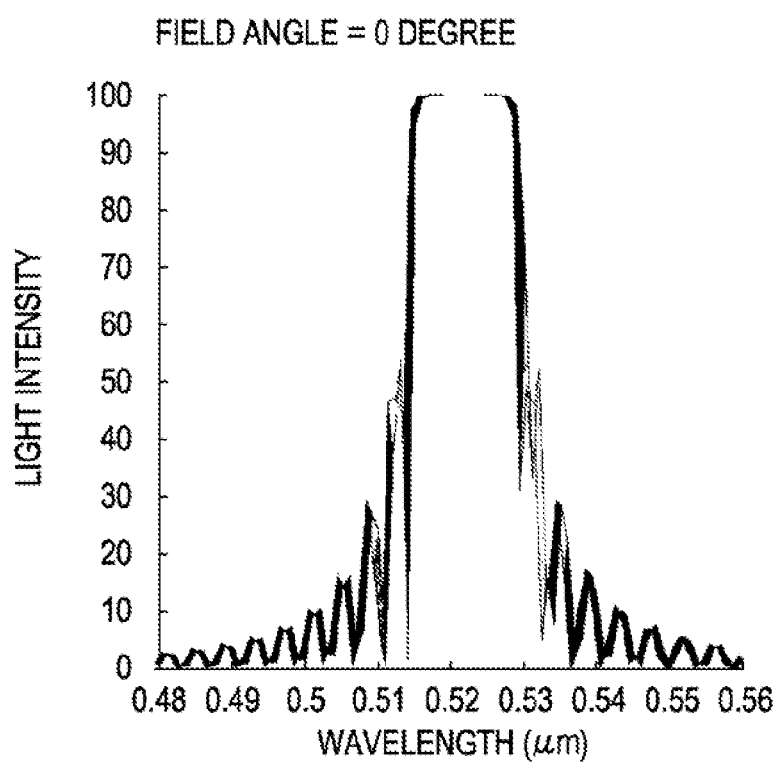
Figure 5:
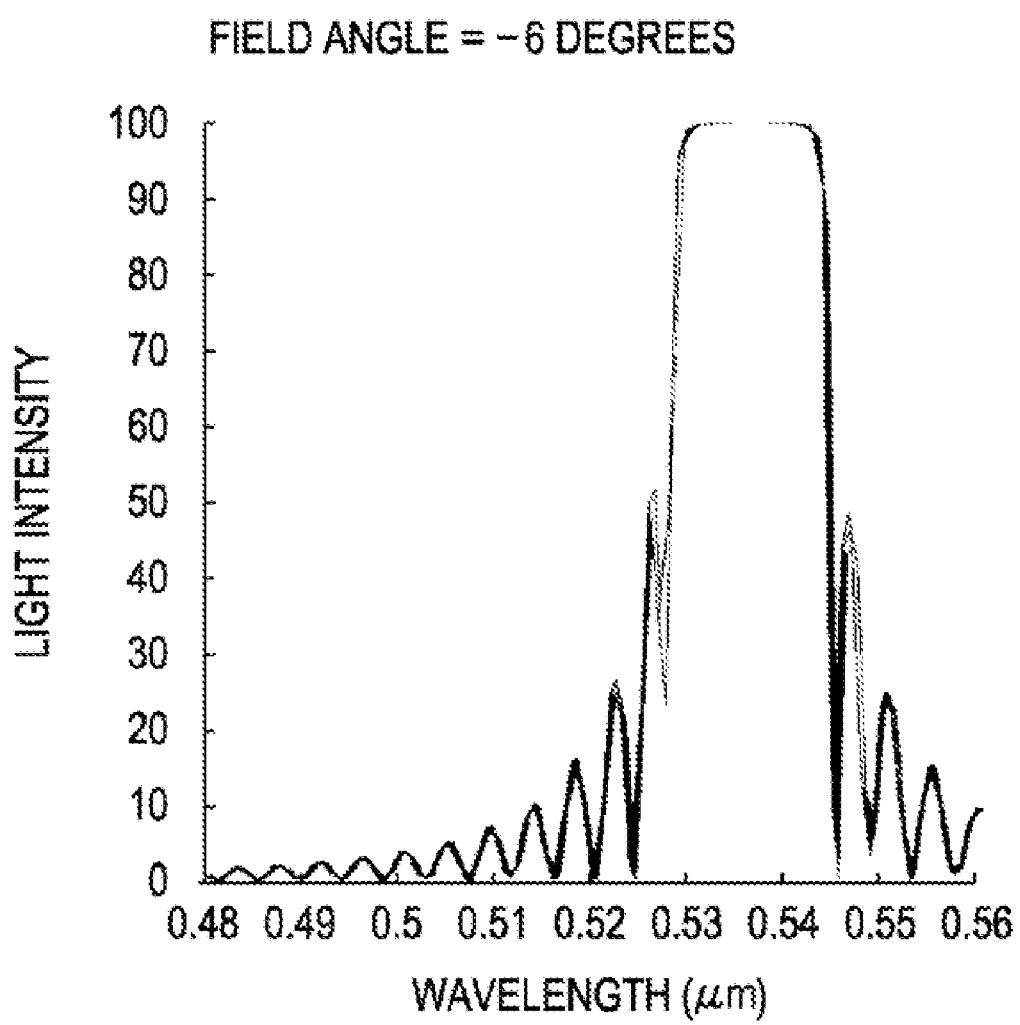
FIG. 5 is a graph illustrating a diffraction spectrum in the case of the filed angle θ=−6 degrees with the image display device according to the first embodiment.

FIG. 3 illustrates a diffraction efficiency distribution of light with a wavelength of 480 nm through 560 nm when changing the field angle $\theta$ from −6 degrees to +6 degrees. Here, simulation conditions are set such that the refractive index of the light guide plate 21 is 1.527, and the total reflected angle when the central light (wavelength of 522 nm) is propagated within the light guide plate 21 is 68 degrees. As can be apparent from FIG. 3, a diffraction spectrum is determined according to a field angle. For example, in the case of the field angle $\theta$=+6 degrees, the center wavelength (Bragg wavelength) of a diffraction spectrum exists around 502 mm (see FIG. 4A), and in the case of the field angle $\theta$=0 degree, the center wavelength (Bragg wavelength) of a diffraction spectrum exists around 522 mm (see FIG. 4B), and in the case of the field angle $\theta$=−6 degrees, the center wavelength (Bragg wavelength) of a diffraction spectrum exists around 536 mm (see FIG. 5). That is to say, the Bragg wavelength changes around 34 nm. This change amount is an extremely smaller value than the change amount (48 nm) described with the related art. Thus, the change amount of the Bragg wavelength per a unit incident angle as to an interference pattern can be reduced, whereby occurrence of color irregularities can be prevented effectively, and accordingly, the image display device having high display quality can be provided.

Second Embodiment

Figure 6:
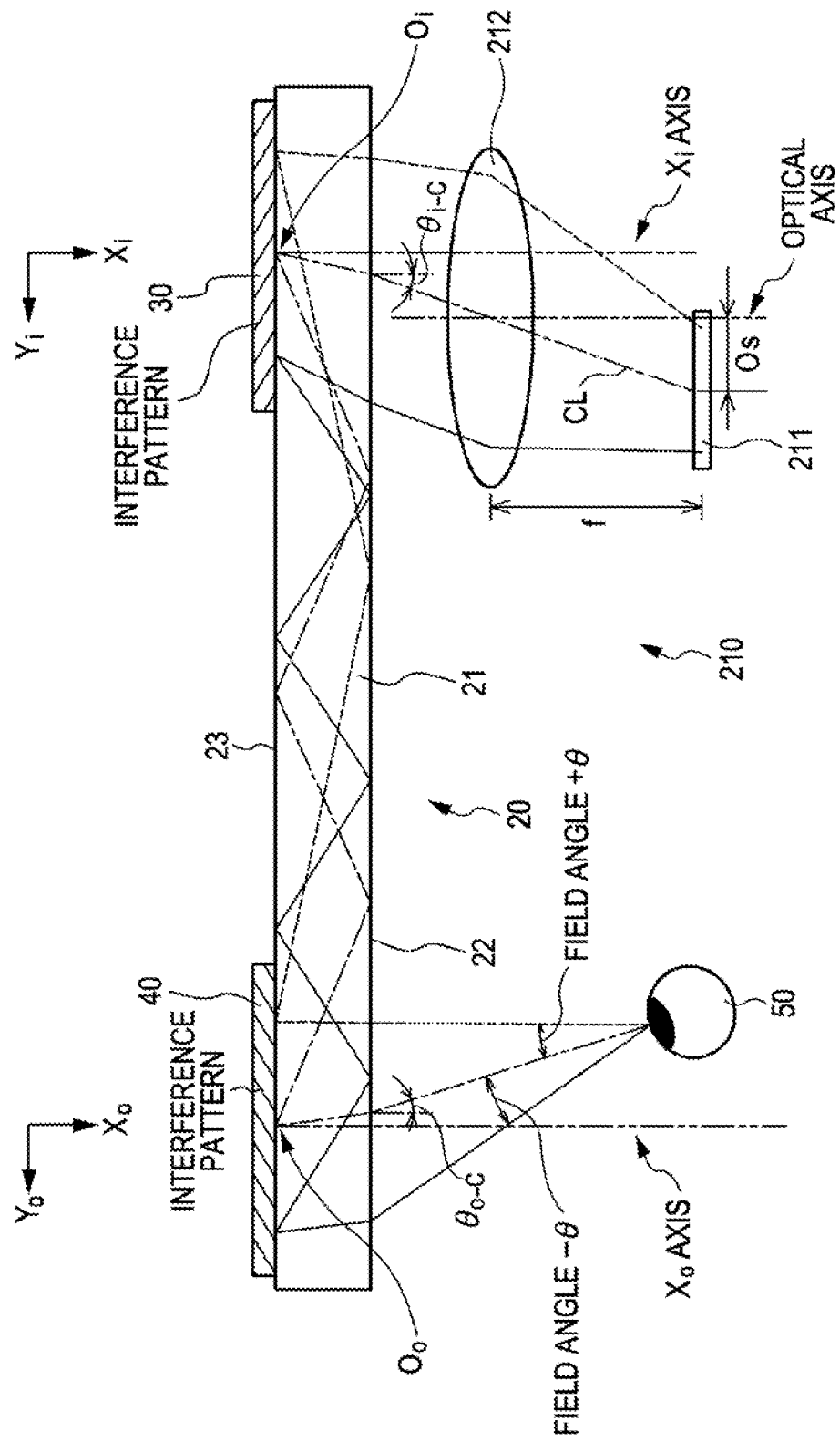
FIG. 6 is a conceptual diagram of an image display device according to a second embodiment.

A second embodiment is a modification of the first embodiment, and specifically, relates to an image display device 210 having a first-B arrangement. That is to say, as a conceptual diagram is shown in FIG. 6, with the second embodiment, the optical axis of a collimating optical system 212 is parallel to the $X_i$ axis. Subsequently, the optical axis of the collimating optical system 212 optically passes through a position deviant from the center of the image forming device 211. According to such an arrangement, the central light CL is optically parallel to the $X_i$-$Y_i$ plane, and is also intersected with the $X_i$-$Z_i$ plane with an acute angle. Specifically, with the second embodiment as well, the central light incident angle $\theta_{i-C}$ is 20 degrees.

Now, we will say that the focal length of the collimating optical system 212 is f, the image forming device 211 is positioned in the focus position of the collimating optical system 212. Also, we will say that the optical axis of the collimating optical system 212 optically passes through a position deviant from the center of the image forming device 211, but distance (distance along the $Y_i$ axis with the second embodiment) from the optical axis of the collimating optical system 212 to the center of the image forming device 211 is Os. Now, if we say that an incident angle when the light of the central light incident angle $\theta_{i-C}$ is input to the light guide plate 21 is $\theta'_{i-C}$ (this angle is equal to the angle $\psi$ shown in FIG. 25B), and the refractive index of the light guide plate 21 is n, the following relational expressions hold.

$$\sin(\theta_{i-C}) = n \cdot \sin(\theta'_{i-C})$$

$$\tan(\theta_{i-C}) = Os/f$$

Accordingly, $$\arctan(Os/f) = \arcsin(n \cdot \sin(\theta'_{i-C})) \quad (1)$$

holds. Therefore, in order to obtain a desired $\theta'_{i-C}$, the values of the Os and f have to be set so as to satisfy the above-mentioned Expression (1).

The arrangement and configuration of the image display device according to the second embodiment may be regarded as the same as those of the image display device according to the first embodiment except for the above-mentioned points, so detailed description thereof will be omitted.

Third Embodiment

Figure 7:
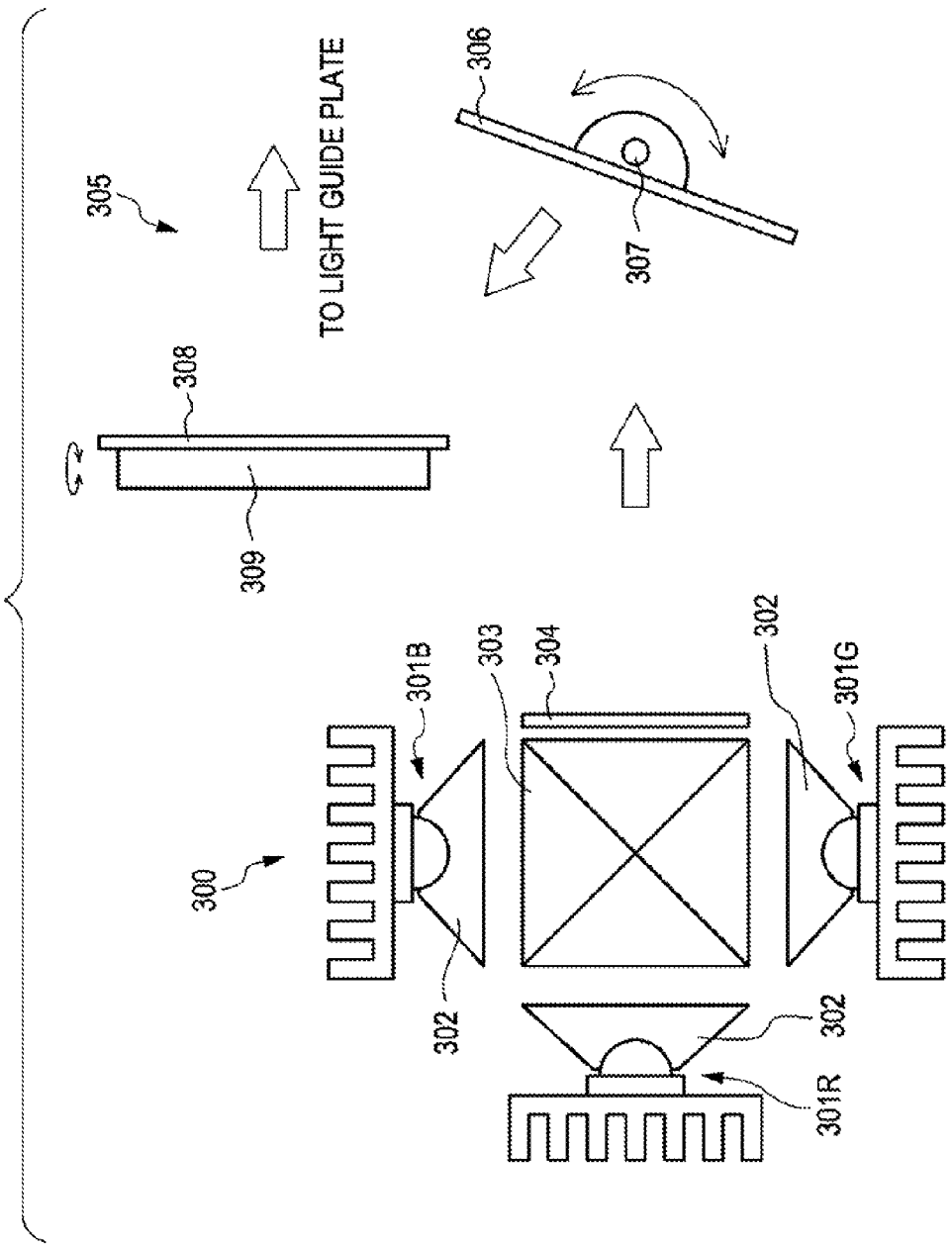
FIG. 7 is a conceptual diagram illustrating a light source and scanning optical system making up an image display device according to a third embodiment.
Figure 8:
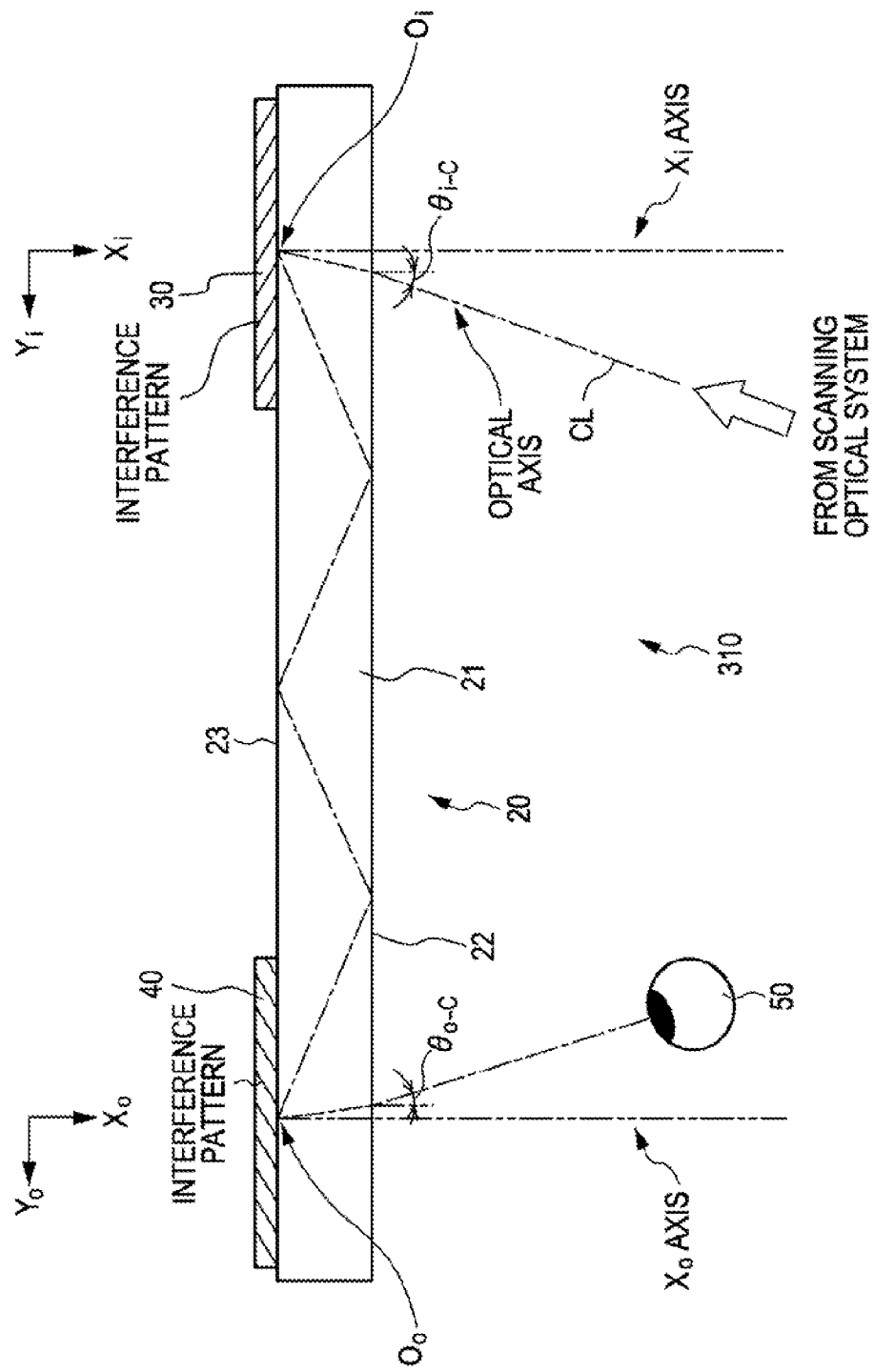
FIG. 8 is a conceptual diagram of a portion of the image display device according to the third embodiment.

A third embodiment is the second mode of the present application, and more specifically, relates to an image display device having a second-A arrangement. An image display device 310 according to the third embodiment, wherein the portions of the light source and scanning optical system are shown in FIG. 7, and the conceptual diagram of a portion of the image display device is shown in FIG. 8, includes (A) A light source 300, (B) A scanning optical system 305 for scanning light emitted from the light source 300, and forming virtual pixels arrayed in a two-dimensional matrix manner, and (C) An optical device 20 which light from the scanning optical system 305 is input to, guided through, and emitted from.

Note that the other components of the image display device 310 excluding the light source 300 and scanning optical system 305 are substantially regarded as the same as those of the image display device 10 described with the first embodiment. That is to say, similar to the first embodiment, the optical device 20 includes (a) An light guide plate 21 wherein input light (more specifically, a parallel light flux group made up of multiple parallel fluxes of which the advancing directions differ) is propagated internally by total reflection, and is then emitted, (b) A first diffraction grating member 30 made up of a reflection-type volume hologram diffraction grating for diffracting and reflecting the light (parallel light flux group) input to the light guide plate 21 such that the light (parallel light flux group) input to the light guide plate 21 is internally subjected to total reflection, which is disposed in the light guide plate 21, and (c) A second diffraction grating member 40 made up of a reflection-type volume hologram diffraction grating for diffracting and reflecting the light (parallel light flux group) propagated within the light guide plate 21 by total reflection, and emitting (more specifically, emitting without changing the parallel light flux group) the light from the light guide plate 21, which is disposed in the light guide plate 21. Note that the light emitted from the light guide plate 21 is input to the position (pupil position) of the pupil 50 of the observer.

The light source 300 is operated based on the field sequential method. Specifically, as a schematic view is shown in FIG. 7, the light source 300 according to the third embodiment includes ($\alpha$) A red emission device 301R (e.g., AlGaInP semiconductor emission device or GaN semiconductor emission device, which is true for the following description) for emitting a red color, ($\beta$) A green emission device 301G (made up of GaN semiconductor, which is true for the following description) for emitting a green color, ($\gamma$) A blue emission device 301B (made up of GaN semiconductor, which is true for the following description) for emitting a blue color, ($\delta$) A unit for assembling light emitted from each of the red emission device 301R, green emission device 301G, and blue emission device 301B into a single optical path (e.g., dichroic prism 303), and ($\epsilon$) A light passage control device (liquid crystal display device) 304 for controlling passage/non-passage of light emitted from the unit (dichroic prism 303) for assembling the light into a single optical path. The light emitted from the emission devices 301R, 301G, and 301B is guided by a light guiding member 302 made up of a light guide member made up of a permeable material such as a silicon resin, epoxy resin, or polycarbonate resin, or a reflection member such as a mirror or the like, and is input to the light passage control device 304.

Subsequently, an image is displayed by the light passage control device 304 controlling passage/non-passage of emission light emitted from such emission devices. Color display employing the field sequential method can also be performed. One pixel worth of light is emitted from the light passage control device 304. Subsequently, this light passes through an unshown light source collimating optical system, and is scanned by the scanning optical system 305 made up of, for example, a horizontal scanning galvanomirror 306 which rotates around a rotation axis 307 (extending in the direction perpendicular to the page space of the drawing) parallel to the Z axis, and a vertical scanning galvanomirror which rotates around a rotation axis 309 (extending in the direction parallel to the page space of the drawing) included in the X-Y plane, thereby forming virtual pixels arrayed in a two-dimensional matrix manner. Subsequently, the light (parallel light) emitted from the scanning optical system 305 is input to the first face 22 of the light guide plate 21.

With the image display device according to the third embodiment, the central light emitted from the center of the light source 300, and passed through the virtual pixel of the center of the scanning optical system 305 is optically parallel to the $X_i$-$Y_i$ plane, and is also intersected with the $X_i$-$Z_i$ plane with an acute angle. That is to say, with the third embodiment as well, the central light incident angle $\theta_{i-C}$ has a positive value less than 90 degrees (more specifically, 20 degrees) in the $X_i Y_i Z_i$ coordinates system.

Now, with the third embodiment, the center axis of the scanning optical system 305 is parallel to the $X_i$-$Y_i$ plane (more specifically, positioned within the $X_i$-$Y_i$ plane), and is also intersected with the $X_i$-$Z_i$ plane with an acute angle (specifically, 70 degrees). Subsequently, an angle made up of such central light CL immediately before the central light CL is input to the light guide plate 21, and the $Y_i$ axis has a positive value ($90°-\theta_{i-C}$). Here, the value of the $\theta_{i-C}$ is, as describe above, 20 degrees. Note that, with the third embodiment, there are a case wherein the center of the light source 300 is positioned on an extended line of the center axis of the scanning optical system 305, and a case wherein the center of the light source 300 is not positioned on an extended line of the center axis of the scanning optical system 305, but in the latter case, an embodiment has to be employed wherein the center axis of the scanning optical system 305 optically passes through the center of the light source 300 via various types of optical system.

With the image display device according to the third embodiment or fourth embodiment which will be described next as well, similar to the first embodiment, the change amount of the Bragg wavelength per an unit incident angle as to an interference pattern can be reduced, and consequently, occurrence of color irregularities can be prevented effectively, and accordingly, the image display device having high display quality can be provided.

Fourth Embodiment

Figure 9:
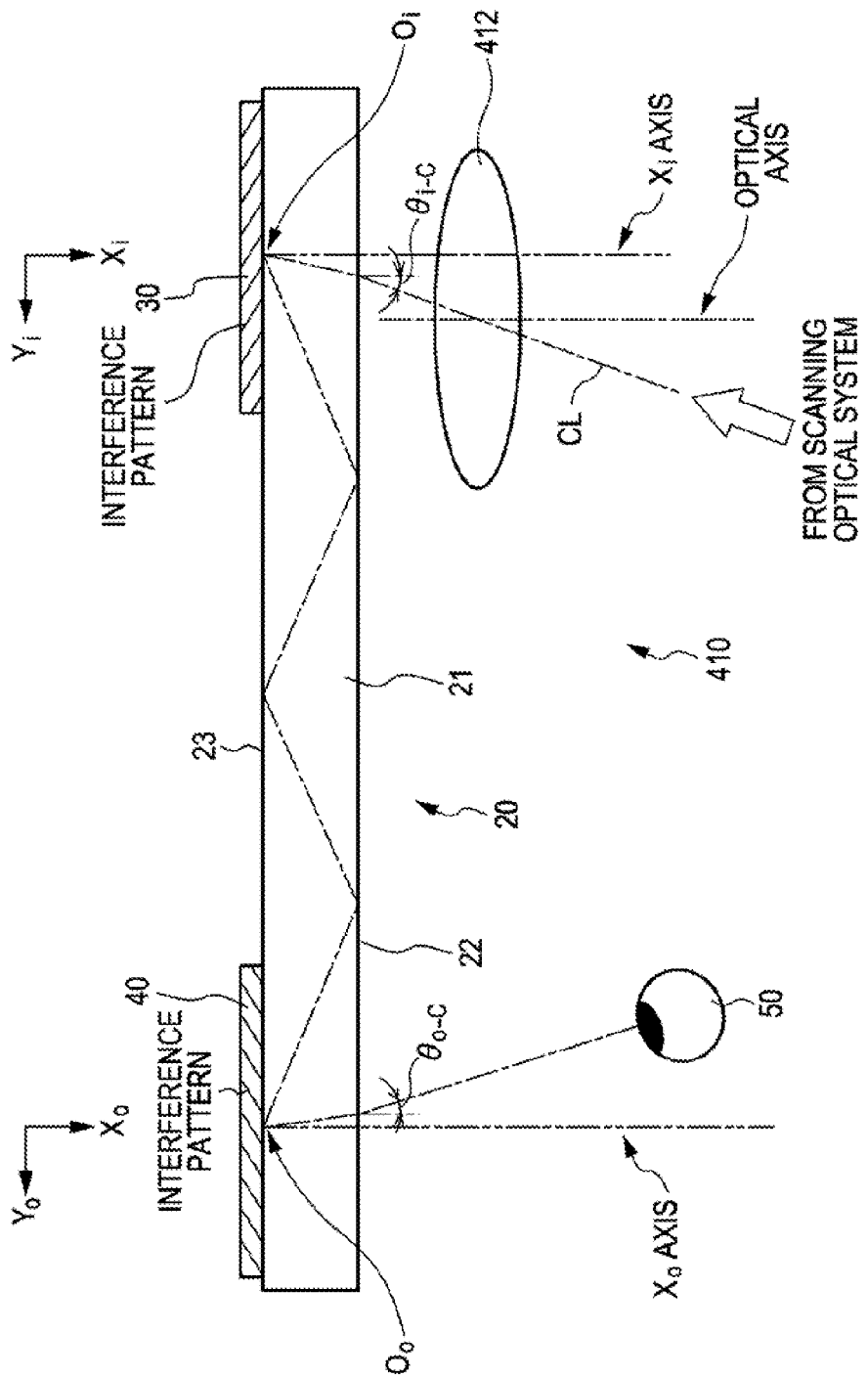
FIG. 9 is a conceptual diagram of a portion of an image display device according to a fourth embodiment.

A fourth embodiment is a modification of the third embodiment, and specifically, relates to an image display device having a second-B arrangement. That is to say, as a conceptual diagram of a portion of the image display device is shown in FIG. 9, an image display device 410 according to the fourth embodiment further includes a collimating optical system for converting the light emitted from the scanning optical system 305 into parallel light, and the center axis of the scanning optical system 305 is parallel to the $X_i$ axis, but is not identical to the $X_i$ axis. According to such an arrangement, an angle made up of such central light CL immediately before the central light CL is input to the light guide plate 21, and the $Y_i$ axis has a positive value ($90°-\theta_{i-C}$). Specifically, with the fourth embodiment as well, the central light incident angle $\theta_{i-C}$ is 20 degrees.

The arrangement and configuration of the image display device 410 according to the fourth embodiment may be regarded as the same as those of the image display device 310 according to the third embodiment except for the above-mentioned points, so detailed description thereof will be omitted. Also, the image display device 410 according to the fourth embodiment has to be designed so as to satisfy the above-mentioned Expression (1), and further, by taking Expression (A) and Expression (B) into consideration.

Fifth Embodiment

Figure 10:
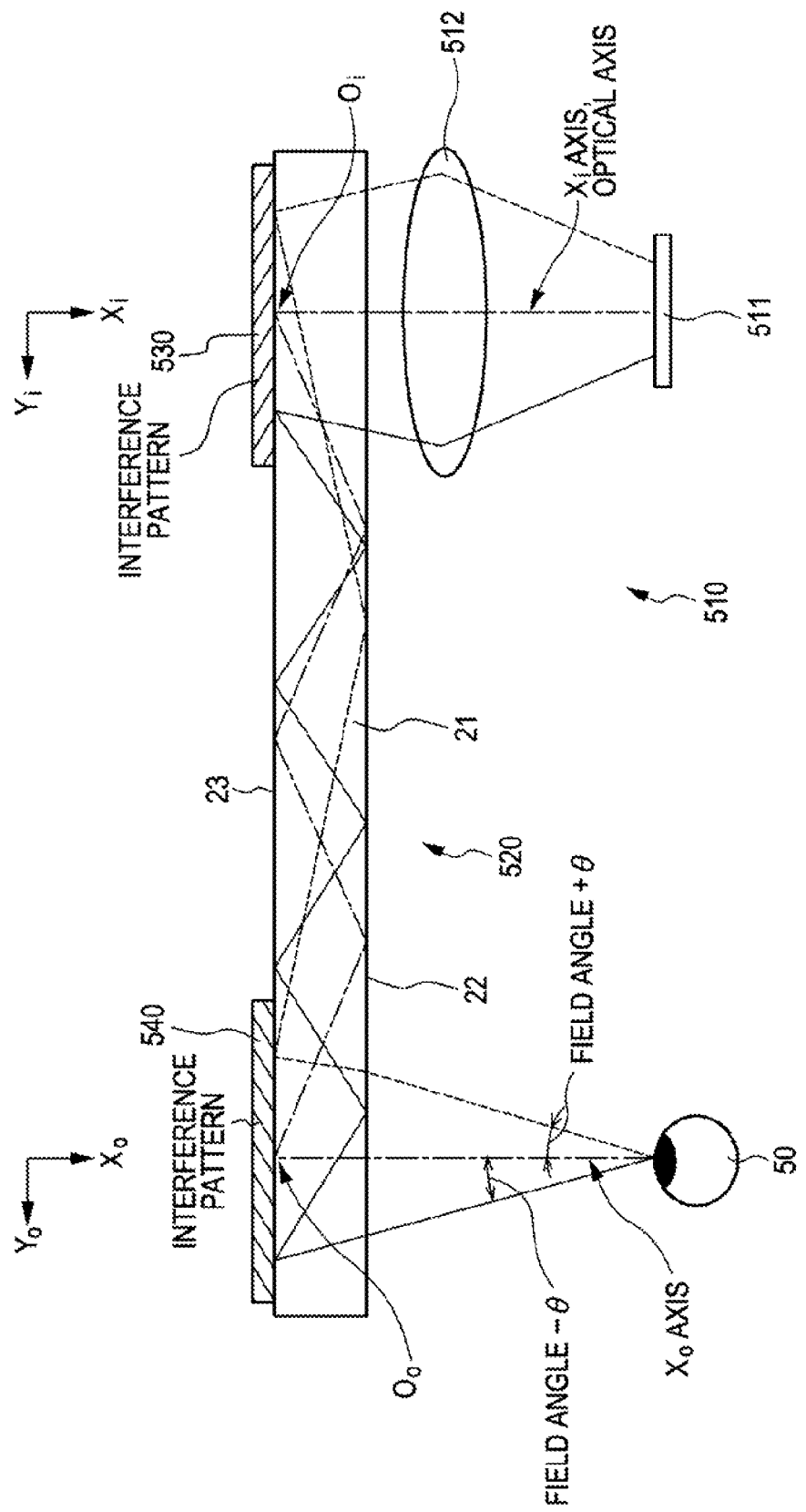
FIG. 10 is a conceptual diagram of an image display device according to a fifth embodiment.

A fifth embodiment relates to an image display device according to the third mode and fifth mode of the present application. The basic arrangement and configuration of an image display device 510 according to the fifth embodiment of which the conceptual diagram is shown in FIG. 10 are the same as those of the image display device 10 described with the first embodiment. Subsequently, with the image display device 510 according to the fifth embodiment, the thickness of a second diffraction grating member 540 is thinner than the thickness of a first diffraction grating member 530. Specifically, the thickness of the second diffraction grating member 540 is less than 5 μm, and the thickness of the first diffraction grating member 530 is equal to or greater than 5 μm, and more specifically, the thickness of the second diffraction grating member 540 is 1.7 μm, and the thickness of the first diffraction grating member 530 is 7 μm. Alternatively, with the image display device 510 according to the fifth embodiment, the value of the maximum diffraction efficiency of the second diffraction grating member 540 is smaller than the maximum diffraction efficiency of the first diffraction grating member 530. Specifically, the maximum diffraction efficiency of the second diffraction grating member 540 is less than 50%, and the maximum diffraction efficiency of the first diffraction grating member 530 is equal to or greater than 50%, and more specifically, the maximum diffraction efficiency of the second diffraction grating member 540 is less than 30%, and the maximum diffraction efficiency of the first diffraction grating member 530 is equal to or greater than 90%. More specifically, the refractive index modulation degree Δn of the second diffraction grating member 540 is 0.04, and the thickness is 1.7 μm. Also, the refractive index modulation degree Δn of the first diffraction grating member 530 is 0.04, and the thickness is 7 μm.

Note that with a later-described sixth embodiment as well, the specifications of the first diffraction grating member 530 and second diffraction grating member 540 are the same.

Now, with the image display device according to the fifth embodiment, different from the image display device according to the first embodiment, the optical axis of the collimating optical system 512 is optically identical to the $X_i$ axis, and moreover, the optical axis of the collimating optical system 512 passes through the center of the image forming device 511. That is to say, the central light incident angle $\theta_{i-C}$ is 0 degree. Note that on an extended line of the collimating optical system 512 the $X_i$ axis exists, and the center of the image forming device 511 is positioned, but the present application is not restricted to this, and accordingly an arrangement may be made wherein on an extended line of the collimating optical system 512 the $X_i$ axis does not exist, and the center of the image forming device 511 is not positioned. Note that in this case, an embodiment has to be employed wherein the optical axis of the collimating optical system 512 is optically identical to the $X_i$ axis, or/and passes through the center of the image forming device 511 through various types of optical system.

The relation between the thickness of the second diffraction grating member 540 and thickness of the first diffraction grating member 530 which is the features of the image display device according to the fifth embodiment may be applied to the image display device described with the first embodiment, and may also be applied to the image display device described with the second embodiment. Also, the relation between the value of the maximum diffraction efficiency of the second diffraction grating member 540 and the value of the maximum diffraction efficiency of the first diffraction grating member 530 which is the features of the image display device according to the fifth embodiment may be applied to the image display device described with the first embodiment, and may also be applied to the image display device described with the second embodiment.

Incidentally, with the image display devices, in order to increase the pupil diameter in the $Y_i$ axis direction without increasing the thickness of the light guide plate, parallel light having the same total reflected angle is diffracted and reflected at the second diffraction grating member to emit this from the light guide plate multiple times. At this time, if the diffraction efficiency of each of the diffraction gratings making up the second diffraction grating member is high, great mass of the light propagated while repeating total reflection within the light guide plate is unintentionally emitted from the light guide plate at the first incidence as to the second diffraction grating member, and is input to the second diffraction grating member at the second and third times, and consequently, the light to be diffracted and reflected is reduced markedly. This prevents substantial enlargement of the pupil diameter. For example, when assuming that the maximum diffraction efficiency of the second diffraction grating member is 90%, 90% of light is emitted from the light guide plate at the first diffraction and reflection, 9% [=(1−0.9)×0.9×100] is emitted at the second diffraction and reflection, 0.9% [=(1−0.9−0.09)×0.9×100] is emitted at the third diffraction and reflection, whereby the image rapidly becomes darker.

Therefore, with the fifth embodiment, the maximum diffraction efficiency of the second diffraction grating member 540 has been set to 30%. Thus, of the light propagated within the light guide plate 21, 30% of the light is emitted from the light guide plate at the first diffraction and reflection of the second diffraction grating member 540, 21% [=(1−0.3)×0.3×100] of the light is emitted at the second diffraction and reflection, and 14.7% [=(1−0.3−0.21)×0.3×100] of the light is emitted at the third diffraction and reflection. Accordingly, the image gradually becomes darker.

Conversely, with the first diffraction grating member 530, the light of each field angle is propagated within the light guide plate 21 at one time of diffraction and reflection, and accordingly it is generally advantageous from the perspective of light use efficiency that the maximum diffraction efficiency is higher. Accordingly, with the fifth embodiment, the maximum diffraction efficiency at the first diffraction grating member 350 has been set to 90%.

Figure 12:
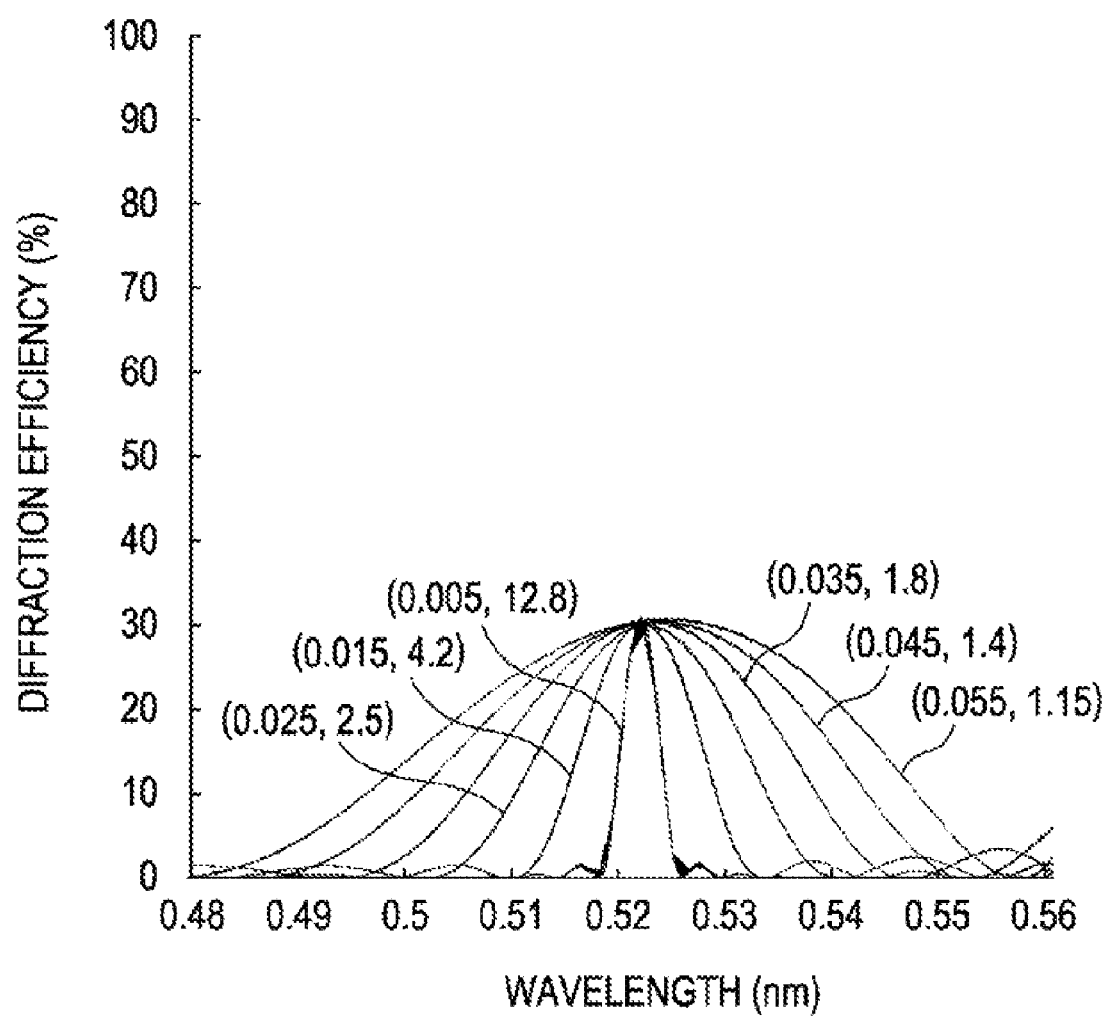
FIG. 12 is a graph illustrating a relation between the refractive-index modulation degree Δn and thickness of a diffraction grating member for the sake of obtaining 30% as the maximum diffraction efficiency when changing a combination between two parameters of the thickness and the refractive-index modulation degree Δn of the diffraction grating member, with the fifth embodiment.

With a diffraction grating member defined with a determined wavelength, incident angle, and diffraction angle, when changing a combination of two parameters of the thickness of the diffraction grating member, and the diffractive index modulation degree Δn of the diffraction grating member, a relation between the diffractive index modulation degree Δn and the thickness of the diffraction grating member for obtaining 30% as the maximum diffraction efficiency is shown in FIG. 12. Simulation conditions have been set as follows. Note that in FIGS. 12, 13, and 14, with numbers in parentheses, the left side denotes the diffractive index modulation degree Δn of the diffraction grating member, and right side denotes the thickness (unit: μm) of the diffraction grating member.

Wavelength: 522 nm
Central light incident angle $\theta_{i-C}$: 0 degree
Central light total reflected angle $\theta_{Ref}$: 68 degrees
Refractive index of light guide plate: 1.527

Figure 13:
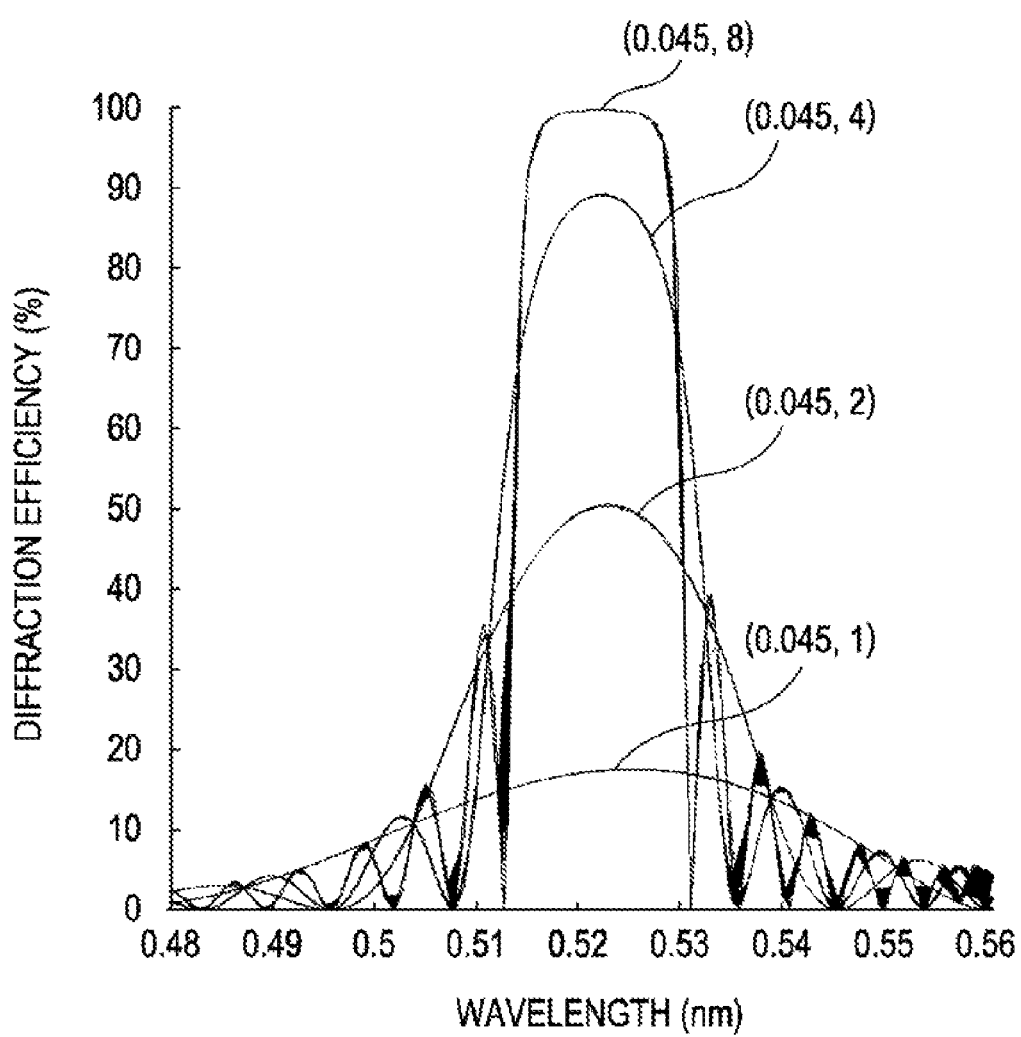
FIG. 13 is a graph illustrating change in diffraction efficiency when assuming that the refractive-index modulation degree Δn of the diffraction grating member is constant (0.045), and changing the thickness of the diffraction grating member, with the fifth embodiment.
Figure 14:
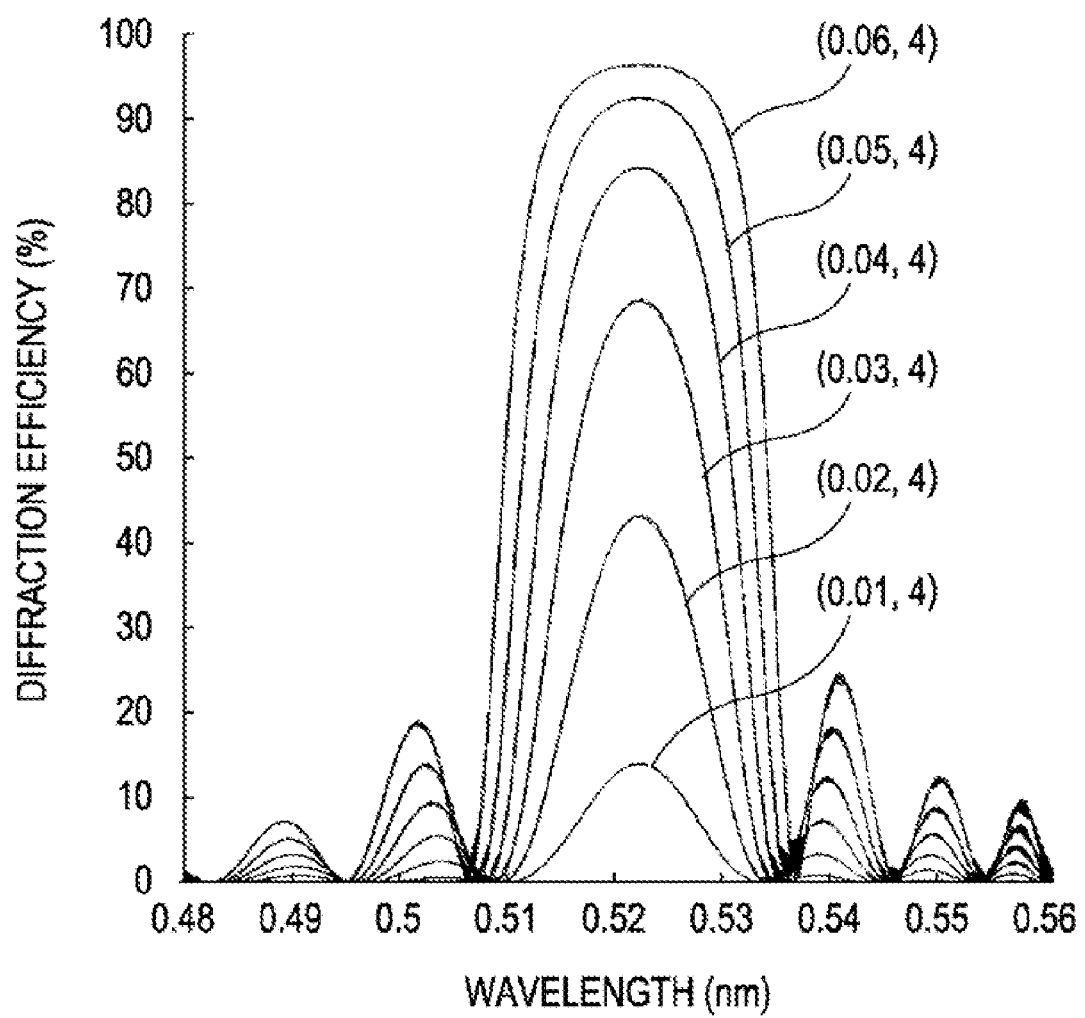
FIG. 14 is a graph illustrating change in diffraction efficiency when assuming that the thickness of the diffraction grating member is constant (4 μm), and changing the refractive-index modulation degree Δn of the diffraction grating member, with the fifth embodiment.

Also, FIG. 13 illustrates change in diffraction efficiency when changing the thickness of the diffraction grating member with the diffractive index modulation degree Δn of the diffraction grating member as constant (0.045), and FIG. 14 illustrates change in diffraction efficiency when changing the diffractive index modulation degree Δn of the diffraction grating member with the thickness of the diffraction grating member as constant (4 μm). It can be found from FIG. 13 that the thinner the thickness of the diffraction grating member is, the more the diffraction efficiency deteriorates. Also, it can be found from FIG. 14 that the lower the diffractive index modulation degree Δn of the diffraction grating member is, the more the diffraction efficiency deteriorates.

Figure 15A:
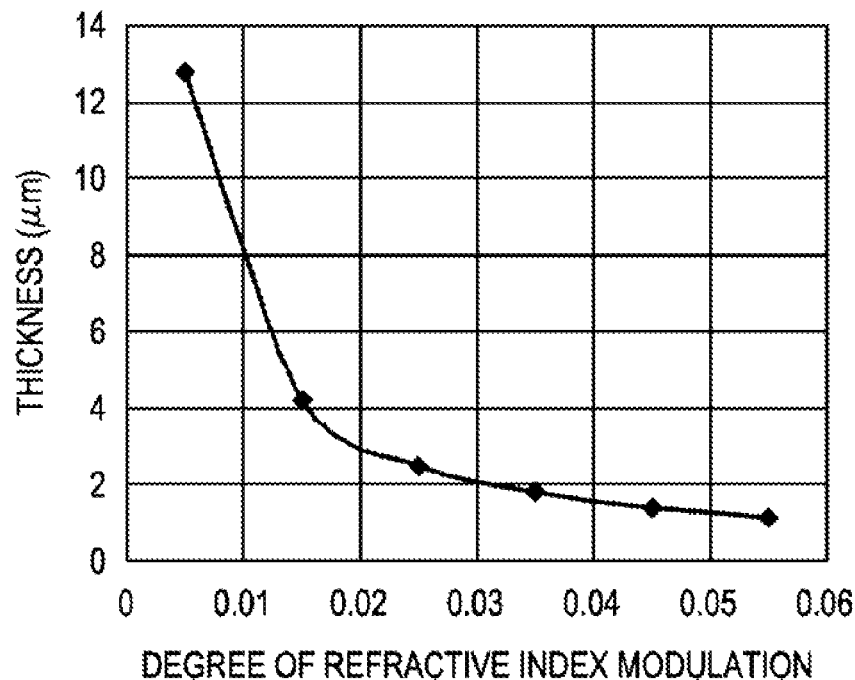
FIGS. 15A and 15B are graphs illustrating a relation between the refractive-index modulation degree Δn and thickness of the diffraction grating member for the sake of obtaining 30% as the maximum diffraction efficiency, and a relation between a half-value width (increments: nm) of a diffraction spectrum of the diffraction grating member, and thickness of the diffraction grating member for the sake of obtaining 30% as the maximum diffraction efficiency, with a fifth embodiment, respectively.
Figure 15B:
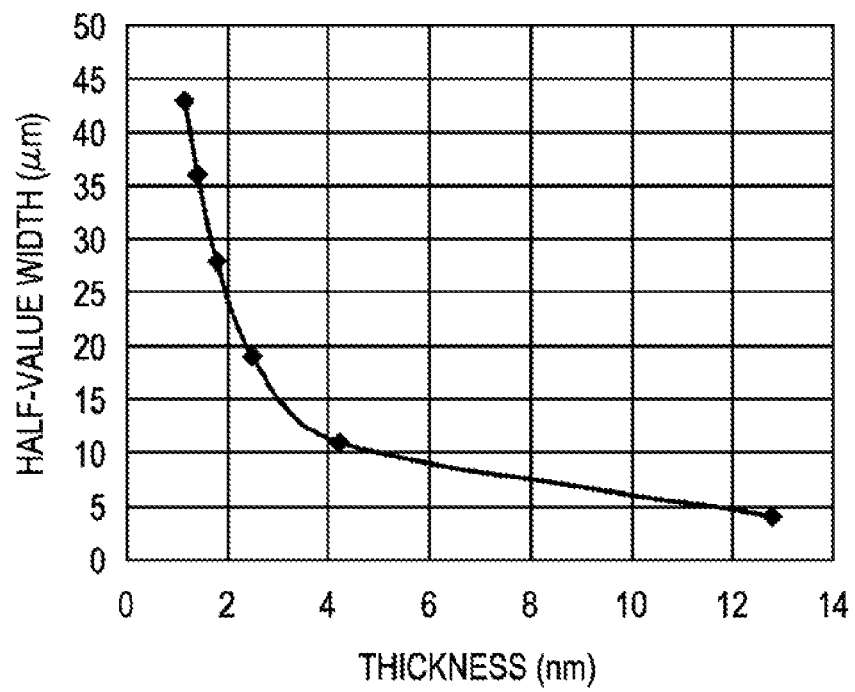

Further, FIG. 15A illustrates a relation between the diffractive index modulation degree Δn and thickness of the diffraction grating member for obtaining the maximum diffraction efficiency 30%, and FIG. 15B illustrates a relation between the half-value width (unit: nm) of a diffraction spectrum of the diffraction grating member and the thickness of the diffraction grating member for obtaining the maximum diffraction efficiency 30%. A combination of the thickness and diffractive index modulation degree Δn of the diffraction grating member may be selected arbitrarily as long as the diffractive index modulation degree Δn is equal to or smaller than the maximum value of the Δn determined with the features of the material making up the diffraction grating member. Incidentally, as can be understood from FIG. 15A, the thinner the thickness of the diffraction grating member is, the greater the value of the diffractive index modulation degree Δn of the diffraction grating member is. On the other hand, as can be understood from FIG. 15B, the thinner the thickness of the diffraction grating member is (i.e., the greater the diffractive index modulation degree Δn is), the wider the diffraction spectral width of diffraction efficiency is.

Consequently, the thinner the thickness of the diffraction grating member is, or the greater the value of the diffractive index modulation degree Δn is, the more diffraction efficiency deteriorates, the changing ratio of light which is diffracted and reflected at the second diffraction grating member 540 multiple times, and emitted from the light guide plate 21 can be reduced, whereby the image gradually becomes darker. Accordingly, the pupil diameter in the axis line direction of the light guide plate can be increased, and moreover, a problem can be solved wherein the brightness of a display image is markedly changed according to the pupil position in the axis line direction of the light guide plate, whereby the image display device with high-uniformity of brightness can be provided without markedly reducing light use efficiency.

Figure 24A:
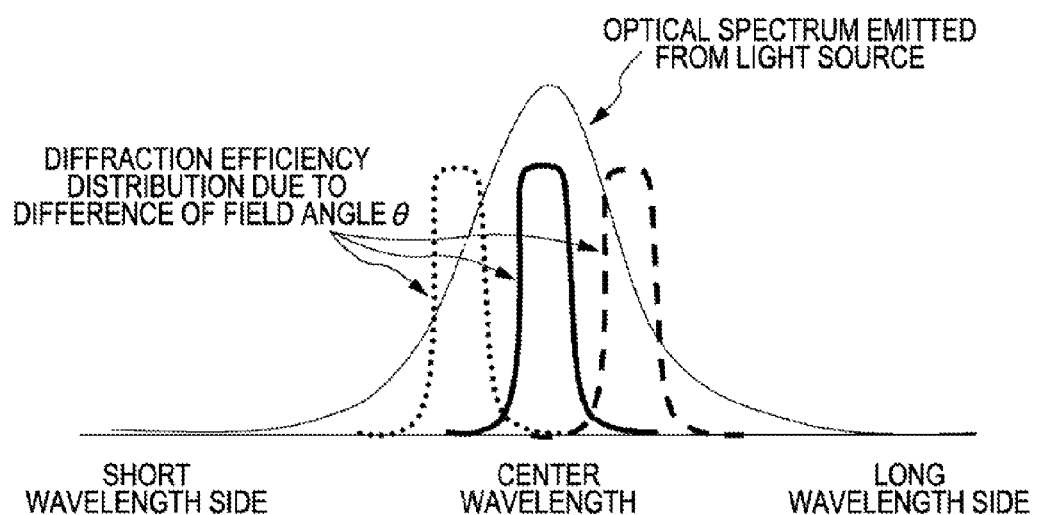
FIGS. 24A and 24B are a graph illustrating a relation between the diffraction efficiency due to the difference of the field angle θ, and the center wavelength of a diffraction spectrum, and a graph schematically illustrating the emission spectrum of light emitted from the light source.
Figure 24B:
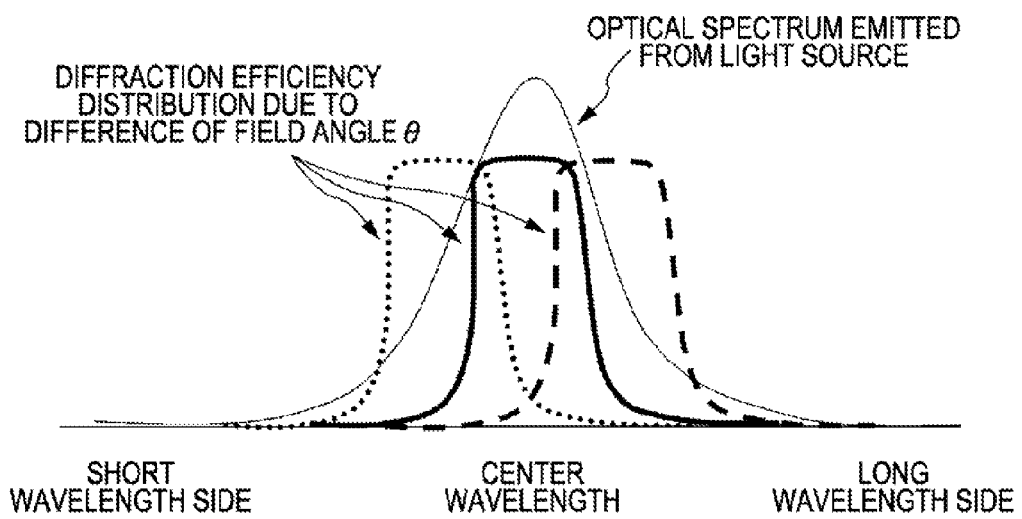

It can be exemplified as one effective technique for reducing the problem described with reference to FIG. 24A to widen the diffraction spectral width of the diffraction efficiency of the second diffraction grating member. As shown in FIG. 24B, the diffraction spectral width of the diffraction efficiency is widened, whereby change in principal wavelengths determined with the product between the emission spectrum distribution of the light source and the diffraction efficiency can be reduced. Accordingly, the image display device according to the fifth embodiment is employed, whereby change in Bragg wavelengths according to a field angle can be reduced, and the color irregularities of a display image can be reduced.

Note that the above-mentioned argument can be applied to an image display device according a sixth embodiment which will be described next.

Sixth Embodiment

A sixth embodiment relates to an image display device according to the fourth mode and sixth mode of the present application. The basic arrangement and configuration of the image display device according to the sixth embodiment are the same as those of the image display device described with the third embodiment. Subsequently, with the image display device according to the sixth embodiment, the thickness of the second diffraction grating member 540 is thinner than the thickness of the first diffraction grating member 530. Also, with the image display device according to the sixth embodiment, the value of the maximum diffraction efficiency of the second diffraction grating member 540 is smaller than the value of the maximum diffraction efficiency of the first diffraction grating member 530.

Figure 11:
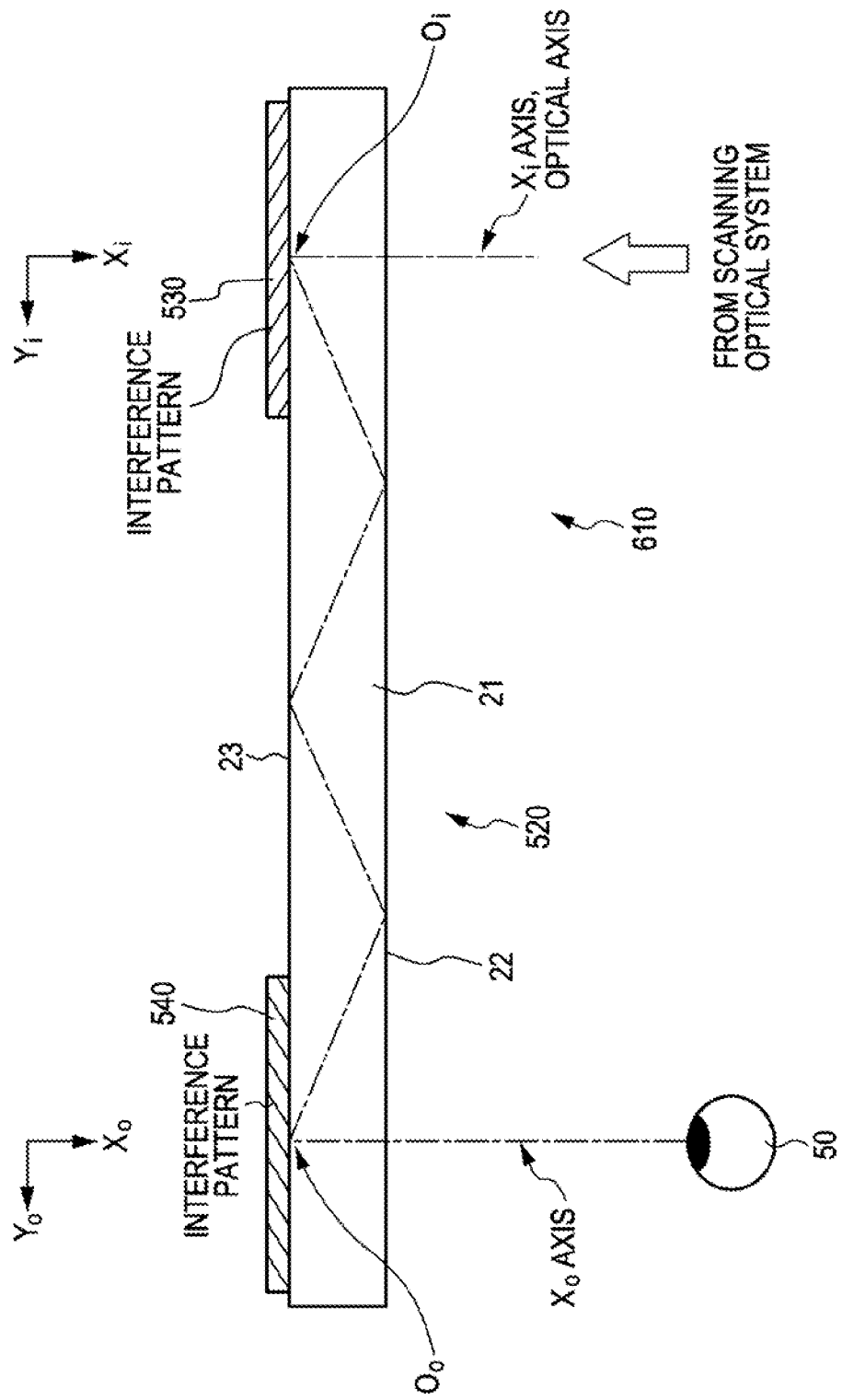
FIG. 11 is a conceptual diagram of a portion of an image display device according to a sixth embodiment.

Here, with the image display device according to the sixth embodiment, as a conceptual diagram shown in FIG. 11, different from the image display device according to the third embodiment, the center axis of the scanning optical system is optically identical to the $X_i$ axis. That is to say, the central light incident angle $\theta_{i-C}$ is 0 degree. Note that there are a case wherein the $X_i$ axis exists on an extending line of the center axis of the scanning optical system, and a case wherein the $X_i$ axis does not exist on an extending line of the center axis of the scanning optical system, but in the latter case, an embodiment has to be employed wherein the center axis of the scanning optical system is optically identical to the $X_i$ axis through various types of optical system.

The relation between the thickness of the second diffraction grating member 540 and the thickness of the first diffraction grating member 530, or/and the relation between the value of the maximum diffraction efficiency of the second diffraction grating member 540 and the value of the maximum diffraction efficiency of the first diffraction grating member 530, which are the features of the image display device according to the sixth embodiment, can be applied to the image display device described with the third embodiment, and can also be applied to the image display device described with the fourth embodiment.

The present application has been described so far based on the preferred embodiments, but the present application is not restricted to such embodiments. The arrangements and configurations of the image display devices described with the embodiments are examples, and can be modified as appropriate. For example, with the first embodiment through sixth embodiment, an arrangement may be made wherein, with the first diffraction grating members 30 and 530, and second diffraction grating members 40 and 540, P types of interference patterns are formed to obtain the same angle of the diffraction and reflection of P types of light flux having a different wavelength band (or wavelength) making up each parallel light flux. With the light guide plate 21, a transparent substrate (e.g., glass substrate) may be disposed above the first diffraction grating member 30 and second diffraction grating member 40 through an air layer, whereby the second face 23 of the light guide plate 21, the first diffraction grating members 30 and 530, and second diffraction grating members 40 and 540 can be protected.

Figure 16:
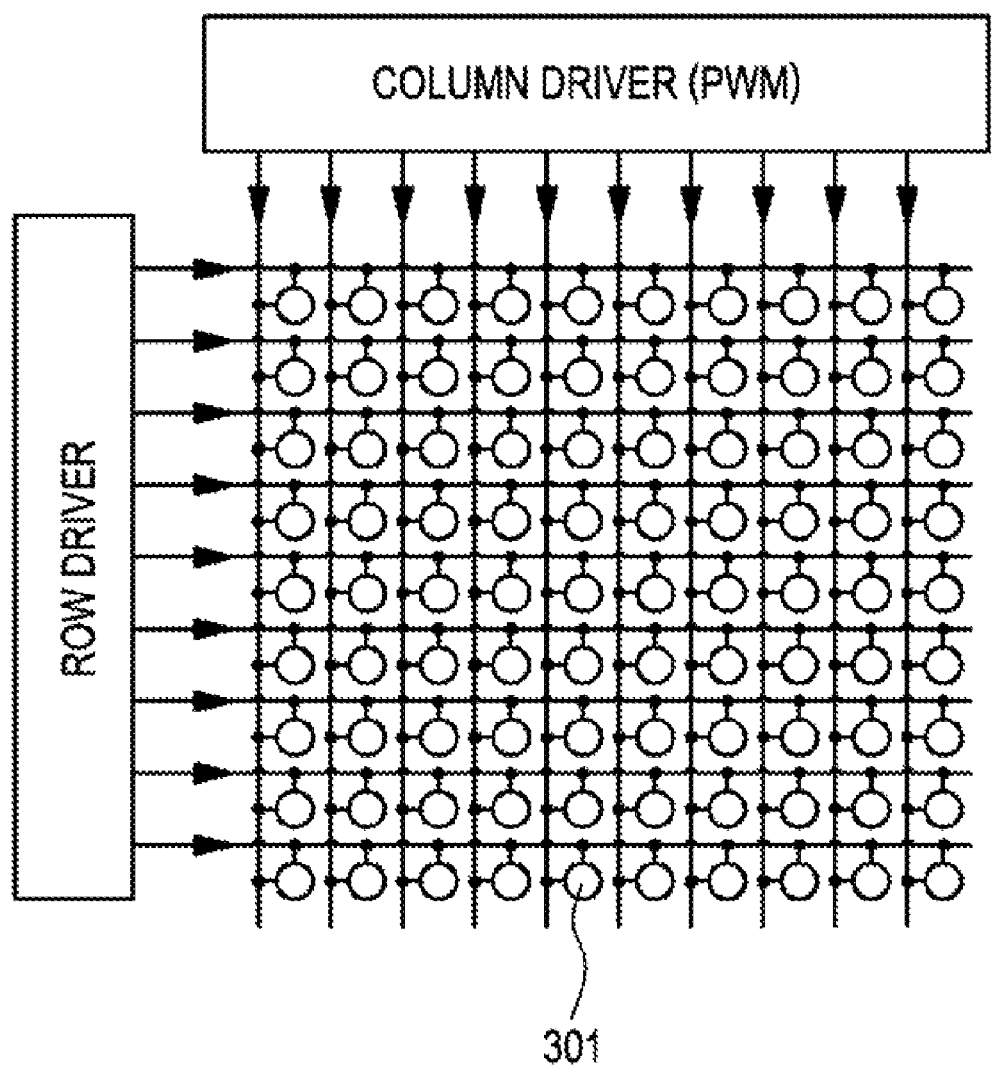
FIG. 16 is a conceptual diagram of a modification of the image forming device adapted to use in the first embodiment, second embodiment, and fifth embodiment.

As an image forming device suitable for usage with the first, second, and fifth embodiments, for example, as a conceptual diagram is shown in FIG. 16, there may be employed an active-matrix-type image forming device, which is made up of an emission panel where the emission devices 301 configured of a semiconductor emission device are arrayed in a two-dimensional matrix manner, displays an image by controlling the emission/non-emission state of each of the emission devices 301 to allow the observer to visually recognize the emission states of the emission devices 301. The light emitted from this image forming device is input to the light guide plate 21 through the collimating optical systems 12, 212, and 512.

Figure 17:
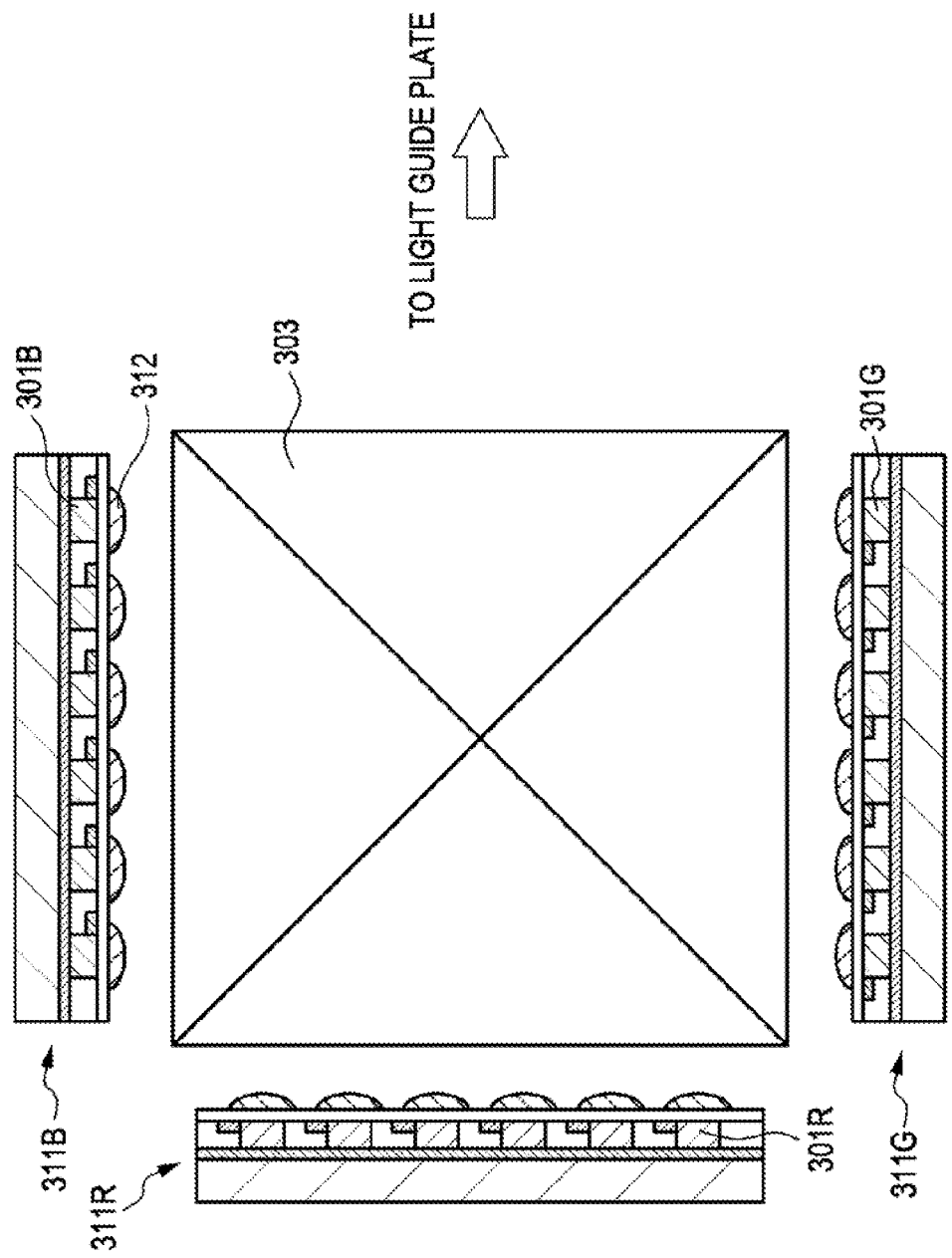
FIG. 17 is a conceptual diagram illustrating another modification of the image forming device.

Alternatively, as a conceptual diagram is shown in FIG. 17, a color display image forming device may be employed, which includes (α) A red emission panel 311R where red emission devices 301R for emitting a red color are arrayed in a two-dimensional matrix manner, (β) A green emission panel 311G where green emission devices 301G for emitting a green color are arrayed in a two-dimensional matrix manner, (γ) A blue emission panel 311B where blue emission devices 301B for emitting a blue color are arrayed in a two-dimensional matrix manner, and (δ) A unit for assembling light emitted from each of the red emission panel 311R, green emission panel 311G, and blue emission panel 311B into a single optical path (e.g., dichroic prism 303), and controls the emission/non-emission state of each of the red emission device 301R, green emission device 301G, and blue emission device 301B. The light emitted from this image forming device is also input to the light guide plate 21 through the collimating optical systems 12, 212, and 512. Note that reference numeral 312 denotes a micro lens for condensing the light emitted from the emission devices.

Figure 18:
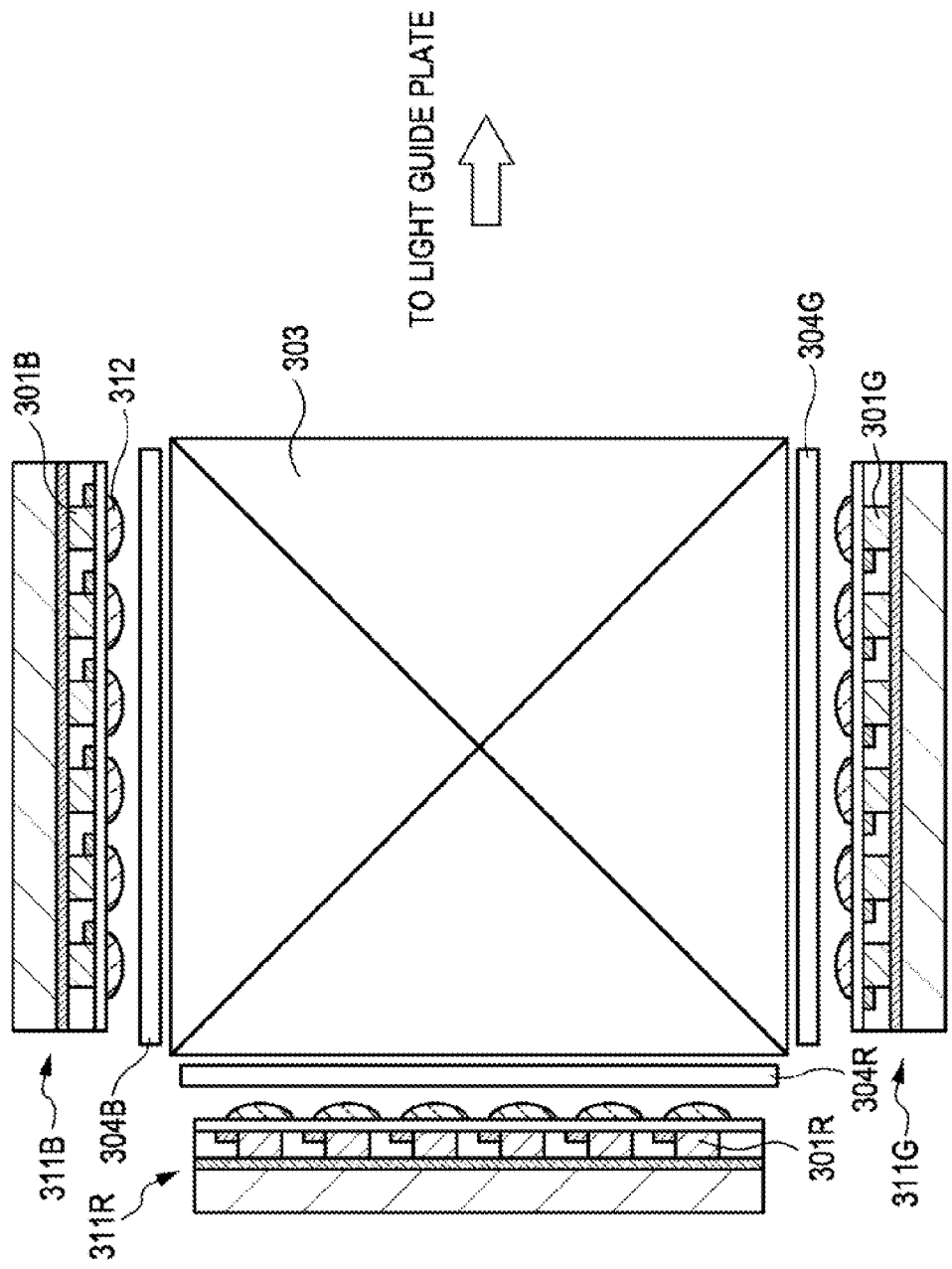
FIG. 18 is a conceptual diagram illustrating yet another modification of the image forming device.

Alternatively, FIG. 18 illustrates a conceptual diagram of the image forming device made up of the emission panels 311R, 311G, 311B, and so forth where the emission devices 301R, 301G, and 301B are arrayed in a two-dimensional matrix manner, wherein the optical beams (light) emitted from the emission panels 311R, 311G, and 311B of which the passage/non-passage are controlled by the light passage control devices 304R, 304G, and 304B respectively are input to the dichroic prism 303, the optical paths of these optical beams (light) are assembled into a single optical path, and are input to the light guide plate 21 through the collimating optical systems 12, 212, and 512.

Figure 19:
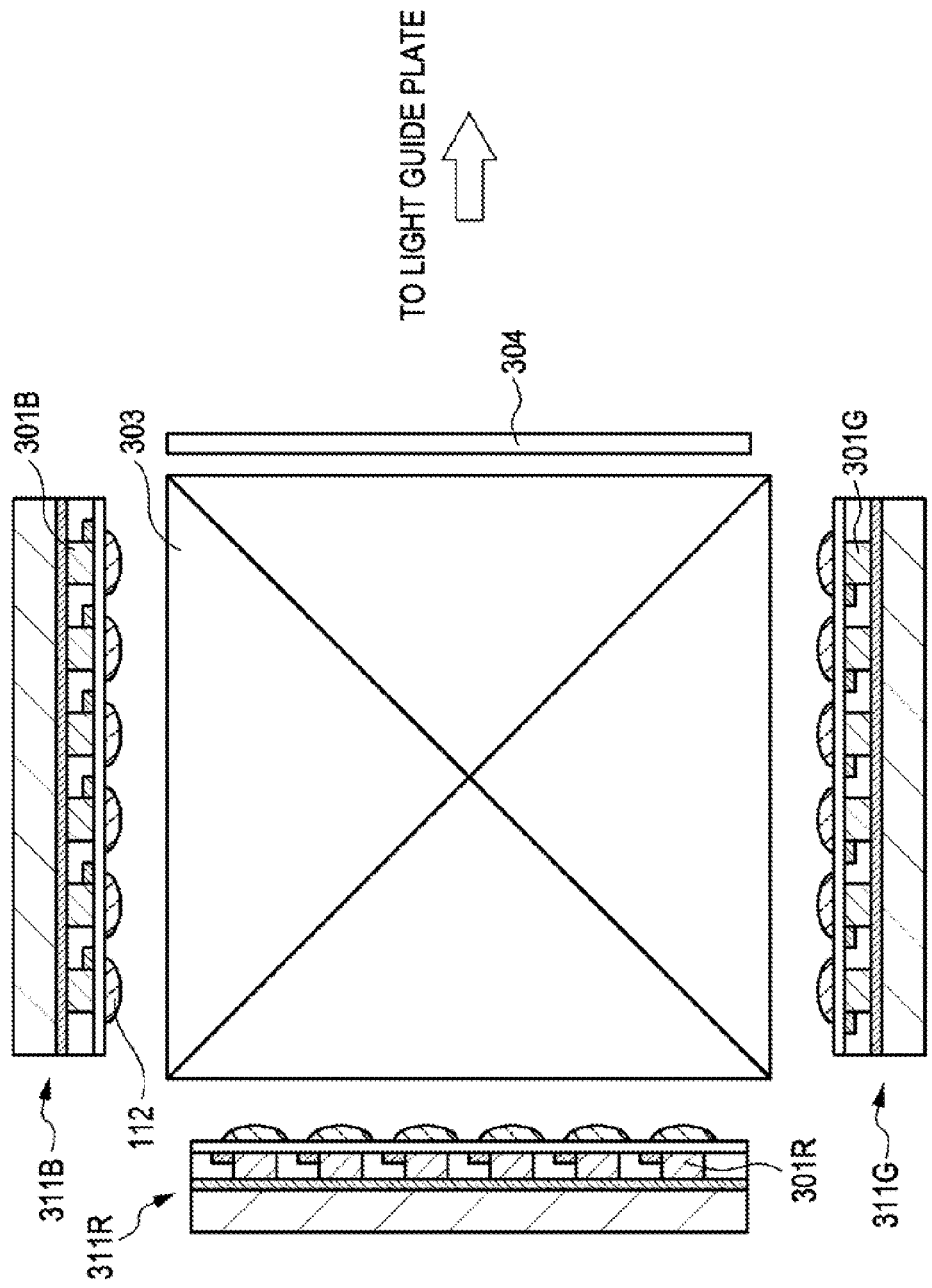
FIG. 19 is a conceptual diagram illustrating yet another modification of the image forming device.

Alternatively, FIG. 19 illustrates a conceptual diagram of the image forming device made up of the emission panels 311R, 311G, 311B, and so forth where the emission devices 301R, 301G, and 301B are arrayed in a two-dimensional matrix manner, wherein the optical beams (light) emitted from the emission panels 311R, 311G, and 311B are input to the dichroic prism 303, the optical paths of these optical beams are assembled into a single optical path, and the optical beams emitted from the dichroic prism 303, each of which the passage/non-passage is controlled by the light passage control device 304, are input to the light guide plate 21 through the collimating optical systems 12, 212, and 512.

Figure 20:
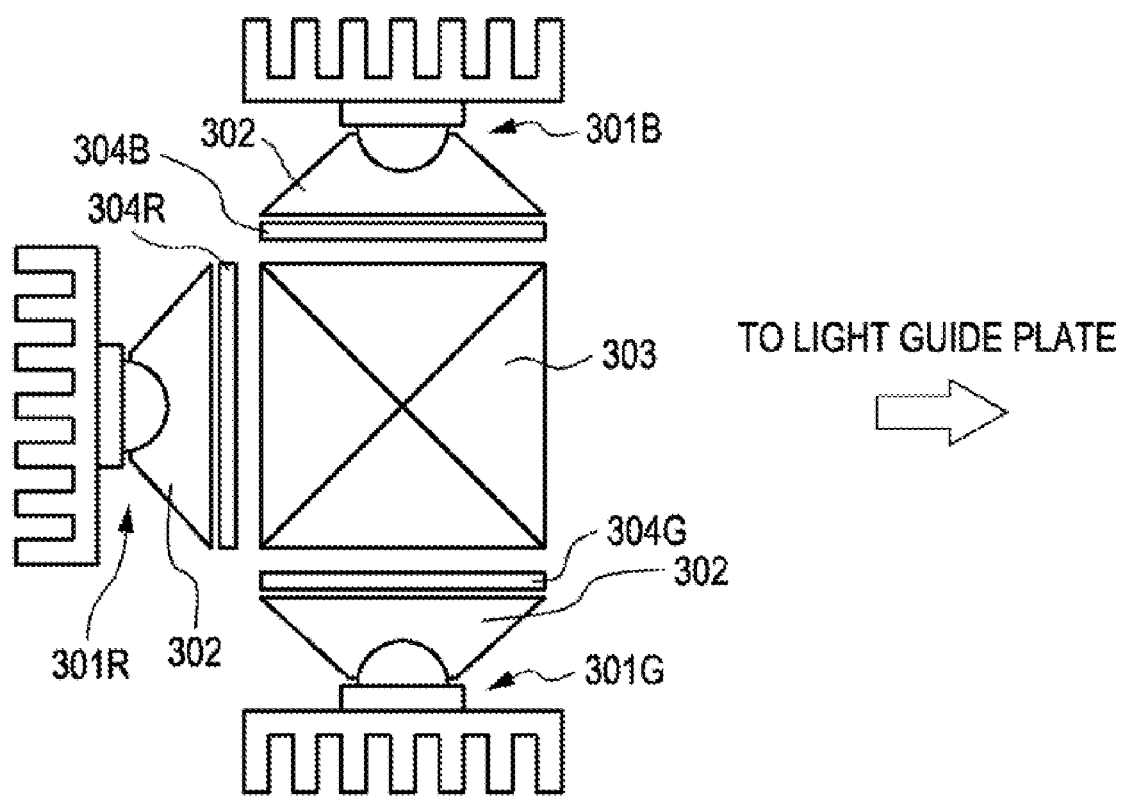
FIG. 20 is a conceptual diagram illustrating yet another modification of the image forming device.
Figure 21:
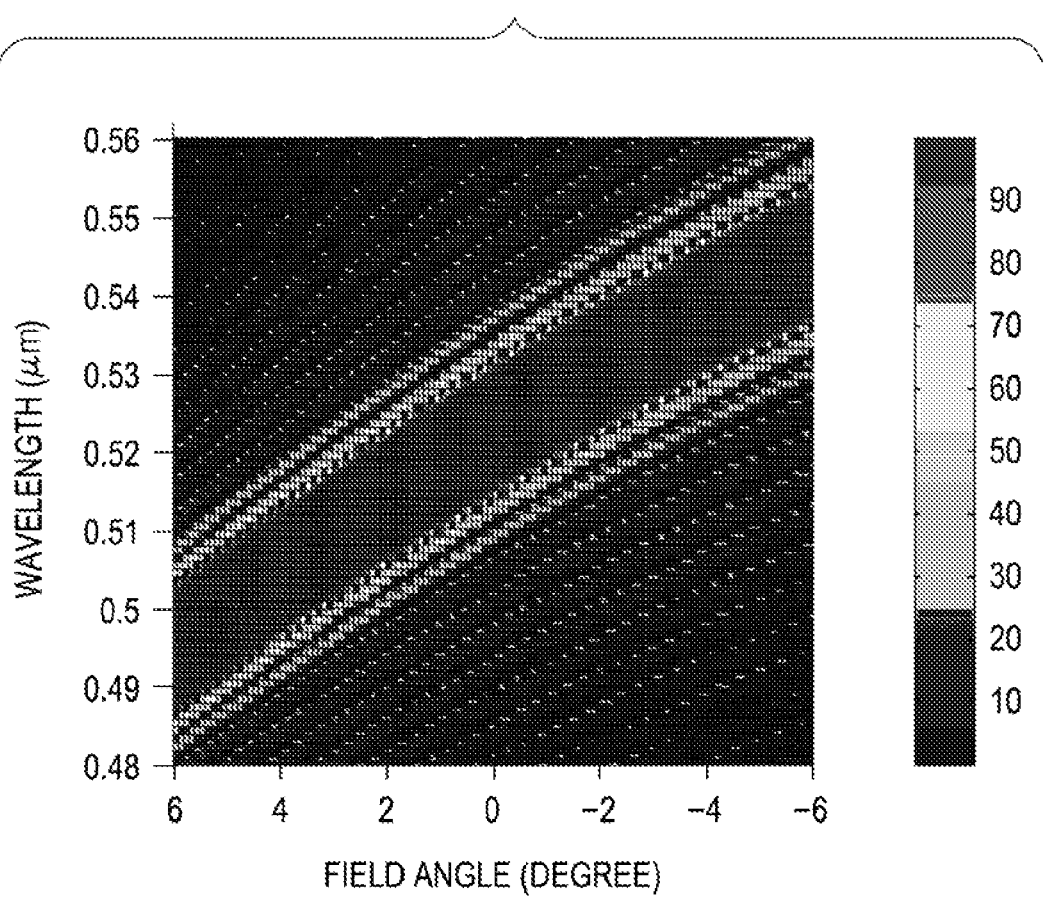
FIG. 21 is a graph illustrating a diffraction efficiency distribution of light with a wavelength of 480 nm through 560 nm when changing the field angle θ from −6 degrees to +6 degrees, with an image display device according to the related art.
Figure 22A:
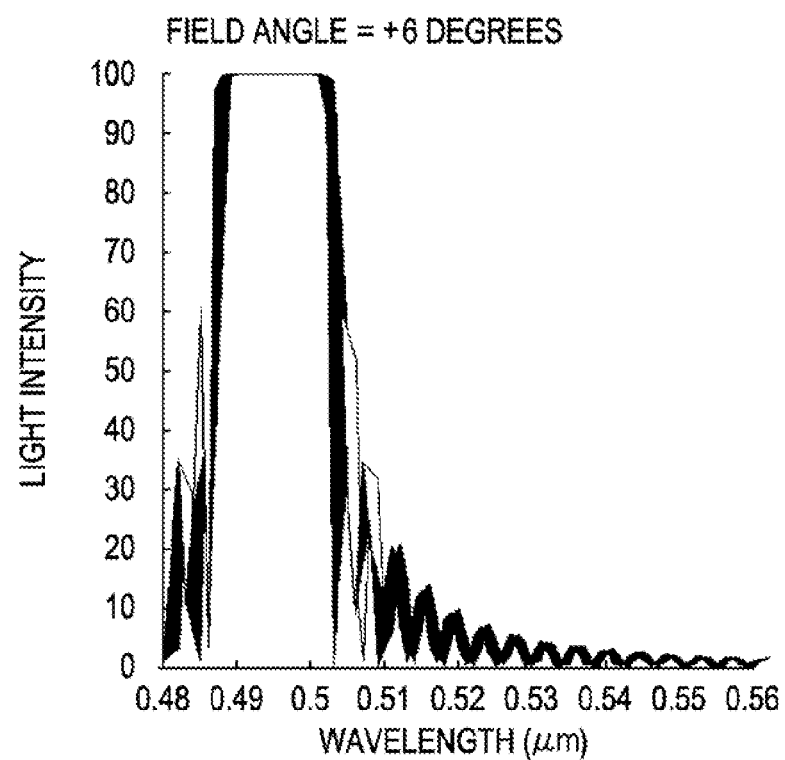
FIGS. 22A and 22B are graphs illustrating a diffraction spectrum in the case of the field angle θ=+6 degrees and in the case of the filed angle θ=0 degree with the image display device according to the related art, respectively.
Figure 22B:
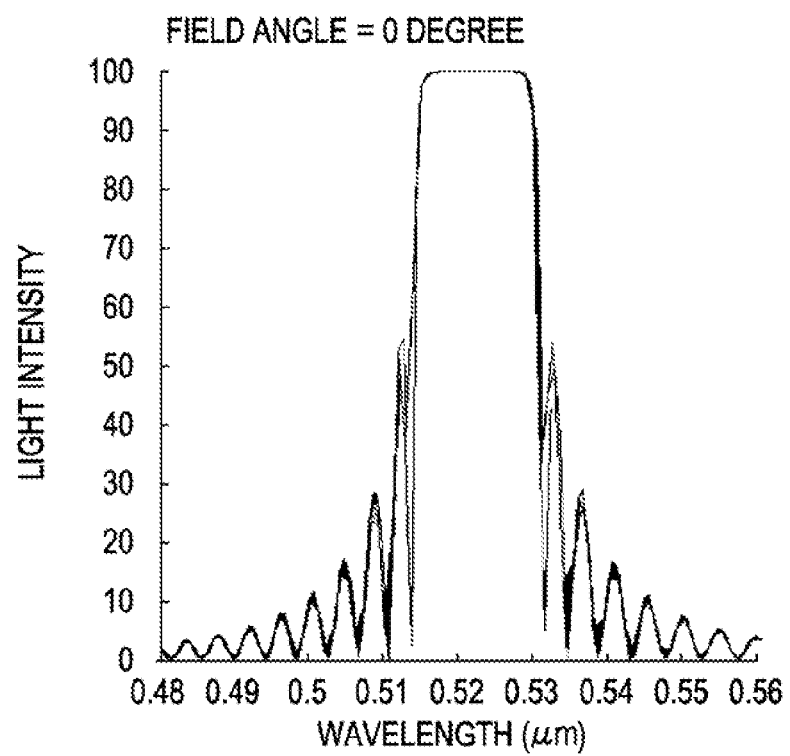
Figure 23:
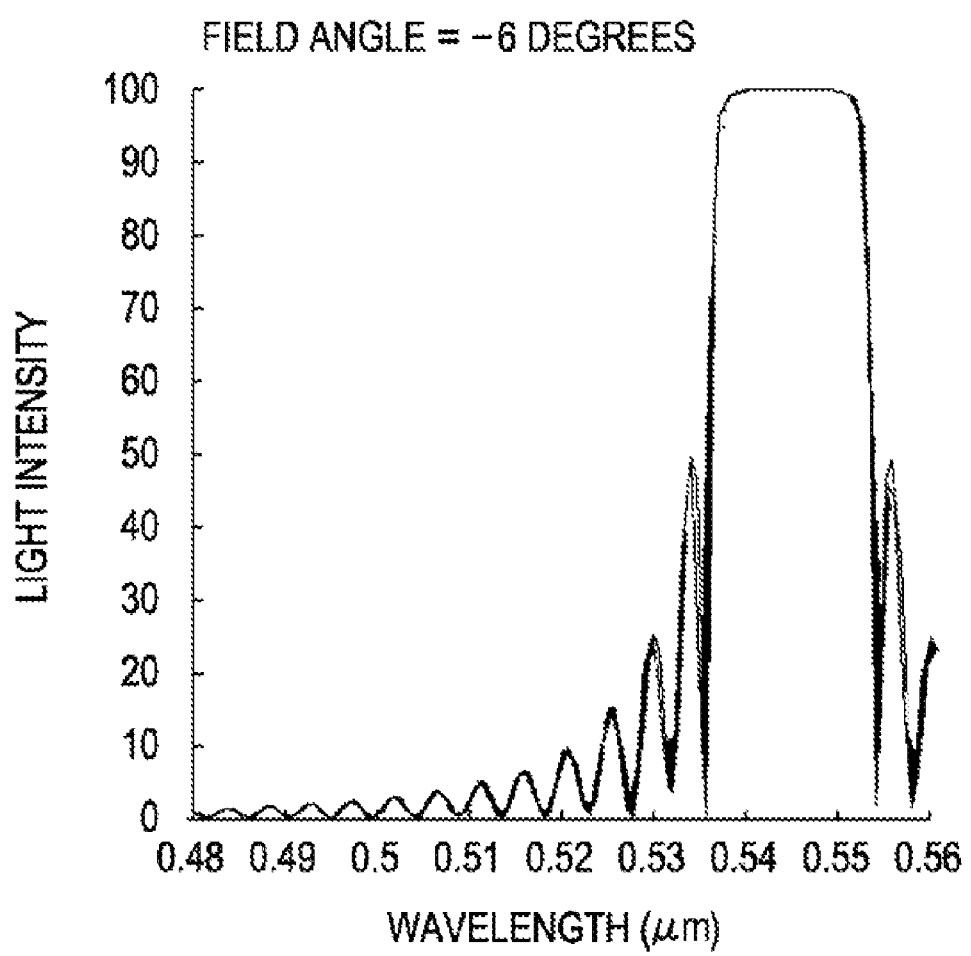
FIG. 23 is a graph illustrating a diffraction spectrum in the case of the filed angle θ=−6 degrees with the image display device according to the related art.

Alternatively, as shown in FIG. 20, an image forming device may be employed, which includes an emission device 301R for emitting a red color, a light passage control device (e.g., liquid crystal display device 304R) which is a type of light valve for controlling passage/non-passage of emission light emitted from the emission device 301R for emitting a red color, an emission device 301G for emitting a green color, a light passage control device (e.g., liquid crystal display device 304G) which is a type of light valve for controlling passage/non-passage of emission light emitted from the emission device 301G for emitting a green color, an emission device 301B for emitting a blue color, a light passage control device (e.g., liquid crystal display device 304B) which is a type of light valve for controlling passage/non-passage of emission light emitted from the emission device 301B for emitting a blue color, a light guiding member 302 for guiding optical beams (light) emitted from the emission devices 301R, 301G, and 301B made up of a GaN semiconductor, and an unit for assembling the optical paths of the optical beams into a single optical path (e.g., dichroic prism 303).

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An image display device comprising:
   an image forming device including a plurality of pixels arrayed in a two-dimensional matrix manner;
   a collimating optical system for converting light emitted from the pixels of the image forming device into parallel light; and
   an optical device which light converted into a plurality of parallel light of which the advancing directions differ by the collimating optical system is input to, and is guided, and is emitted from;
   wherein said optical device includes
   a light guide plate wherein input light is propagated internally by total reflection, and is emitted,
   a first diffraction grating member including a volume hologram diffraction grating for diffracting and reflecting light input to said light guide plate such that light input to said light guide plate is subjected to total reflection within said light guide plate, which is disposed on said light guide plate, and
   a second diffraction grating member including a volume hologram diffraction grating for diffracting and reflecting light propagated within said light guide plate by total reflection, and emitting the light from said light guide plate, which is disposed on said light guide plate;
   and wherein when assuming that the center of said first diffraction grating member is the origin, a normal of said first diffraction grating member passing through the origin with the direction toward said collimating optical system side as the positive direction is an $X_i$ axis, and the axis line of said light guide plate with the direction passing through the origin, orthogonal to the $X_i$ axis, toward said second diffraction grating member side as the positive direction is a $Y_i$ axis, central light emitted from the pixel of the center of said image forming device, and passes through the center of the collimating optical system is optically parallel to an $X_i$-$Y_i$ plane, and is also intersected with an $X_i$-$Z_i$ plane with an acute angle; and wherein the thickness of said second diffraction grating member is thinner than the thickness of said first diffraction grating member.

2. The image display device according to claim 1, wherein said $Y_i$ axis is optically orthogonal to an interference pattern formed in said first diffraction grating member.

3. The image display device according to claim 1, wherein the optical axis of the collimating optical system is parallel to said $X_i$-$Y_i$ plane, and is intersected with said $X_i$-$Z_i$ plane with an acute angle.

4. The image display device according to claim 3, wherein the optical axis of the collimating optical system optically passes through the center of said image forming device.

5. The image display device according to claim 1, wherein the optical axis of the collimating optical system is parallel to the $X_i$ axis;

and wherein the optical axis of the collimating optical system optically passes through a position deviant from the center of said image forming device.

6. The image display device according to claim 1, wherein when assuming that the center of said second diffraction grating member is a second origin, a normal of said second diffraction grating member passing through said second origin with the optical emission direction as the positive direction is an $X_o$ axis, and the axis line of said light guide plate with the direction passing through said second origin orthogonal to said $X_o$ axis departed from said first diffraction grating member side as the positive direction is a $Y_o$ axis, light emitted from said light guide plate which is equivalent to central light is optically parallel to an $X_o$-$Y_o$ plane, and is also intersected with an $X_o$-$Z_o$ plane with an obtuse angle.

7. The image display device according to claim 1, wherein said light emitted from said light guide plate which is equivalent to central light is orthogonal to a straight line connecting the two pupil centers of an observer.

8. The image display device according to claim 1, wherein the value of the maximum diffraction efficiency of said second diffraction grating member is smaller than the value of the maximum diffraction efficiency of said first diffraction grating member.

9. The image display device according to claim 1, wherein said volume hologram diffraction grating is reflection-type volume hologram diffraction grating.

10. An image display device comprising:
an image forming device including a plurality of pixels arrayed in a two-dimensional matrix manner;
a collimating optical system for converting light emitted from the pixels of the image forming device into parallel light; and
an optical device which light converted into a plurality of parallel light of which the advancing directions differ by the collimating optical system is input to, and is guided, and is emitted from;
wherein said optical device includes
a light guide plate wherein input light is propagated internally by total reflection, and is emitted,
a first diffraction grating member including a volume hologram diffraction grating for diffracting and reflecting light input to said light guide plate such that light input to said light guide plate is subjected to total reflection within said light guide plate, which is disposed on said light guide plate, and
a second diffraction grating member including a volume hologram diffraction grating for diffracting and reflecting light propagated within said light guide plate by total reflection, and emitting the light from said light guide plate, which is disposed on said light guide plate;
and wherein the thickness of said second diffraction grating member is thinner than the thickness of said first diffraction grating member.

11. The image display device according to claim 10, wherein the thickness of said second diffraction grating member is less than 5 μm, and the thickness of said first diffraction grating member is equal to or greater than 5 μm.

12. The image display device according to claim 10, wherein said volume hologram diffraction grating is reflection-type volume hologram diffraction grating.

13. An image display device comprising:
an image forming device including a plurality of pixels arrayed in a two-dimensional matrix manner;
a collimating optical system for converting light emitted from the pixels of the image forming device into parallel light; and
an optical device which light converted into a plurality of parallel light of which the advancing directions differ by the collimating optical system is input to, and is guided, and is emitted from;
wherein said optical device includes
a light guide plate wherein input light is propagated internally by total reflection, and is emitted,
a first diffraction grating member including a volume hologram diffraction grating for diffracting and reflecting light input to said light guide plate such that light input to said light guide plate is subjected to total reflection within said light guide plate, which is disposed on said light guide plate, and
a second diffraction grating member including a volume hologram diffraction grating for diffracting and reflecting light propagated within said light guide plate by total reflection, and emitting the light from said light guide plate, which is disposed on said light guide plate;
and wherein the value of the maximum diffraction efficiency of said second diffraction grating member is smaller than the value of the maximum diffraction efficiency of said first diffraction grating member, and
wherein the thickness of said second diffraction grating member is thinner than the thickness of said first diffraction grating member.

14. The image display device according to claim 13, wherein the maximum diffraction efficiency of said second diffraction grating member is less than 50%, and the maximum diffraction efficiency of said first diffraction grating member is equal to or greater than 50%.

15. The image display device according to claim 13, wherein said volume hologram diffraction grating is reflection-type volume hologram diffraction grating.

* * * * *